United States Patent [19]
Cox

[11] 4,201,074
[45] May 6, 1980

[54] SUBMERSIBLE PIPE INSTALLATION SYSTEMS

[75] Inventor: John W. Cox, Oklahoma City, Okla.

[73] Assignee: Transworld Drilling Company, Oklahoma City, Okla.

[21] Appl. No.: 914,573

[22] Filed: Jun. 9, 1978

Related U.S. Application Data

[62] Division of Ser. No. 733,377, Oct. 18, 1976, Pat. No. 4,095,437.

[51] Int. Cl.² .......................... B21D 3/02; F16L 4/00
[52] U.S. Cl. .......................... 72/168; 72/161; 72/164; 72/171; 72/175; 166/341; 166/356; 405/168
[58] Field of Search .............. 166/341, 356; 72/161, 72/168, 166, 170, 173, 175, 171; 405/168, 169

[56] References Cited

U.S. PATENT DOCUMENTS

| | | | |
|---|---|---|---|
| 928,073 | 7/1909 | Schneider | 72/171 |
| 1,857,325 | 5/1932 | Ottenstein | 72/175 X |
| 2,548,616 | 4/1951 | Priestman et al. | 175/103 |
| 2,870,818 | 1/1959 | Herr | 72/164 |
| 3,268,985 | 8/1966 | Smith | 72/171 X |
| 3,373,587 | 3/1968 | Shubin et al. | 72/158 |
| 3,595,052 | 7/1971 | Stech et al. | 72/171 |
| 3,640,080 | 2/1972 | Neal | 405/169 |
| 3,680,342 | 8/1972 | Mott et al. | 72/161 |
| 3,754,404 | 8/1973 | Moore | 405/168 |
| 3,835,687 | 9/1974 | Kubota | 72/369 |
| 3,893,305 | 7/1975 | Walber | 405/168 |
| 4,047,416 | 9/1977 | Johnson | 72/161 X |

Primary Examiner—Milton S. Mehr
Attorney, Agent, or Firm—William G. Addison

[57] ABSTRACT

In general, the present invention provides processes and apparatus for bending and straightening, or otherwise installing marine pipelines at underwater installations, and includes systems in which marine pipelines are installed at water depths to 250 feet or more, utilizing an underwater chamber which may be operated with its interior wet, dry or combinations thereof. In one form, the system provides for interconnecting wellheads or other stations with manifolds or other stations and comprises running marine pipeline generally vertically downwardly from the water surface into the work chamber, mounted in operative association with an underwater wellhead or station, wherein the pipe is bent in the desired radius and through the desired angle and then straightened to exit from the chamber and wellhead in a substantially horizontal attitude such that it may then be pulled to a manifold or other underwater station with, for example, a wire line.

26 Claims, 23 Drawing Figures

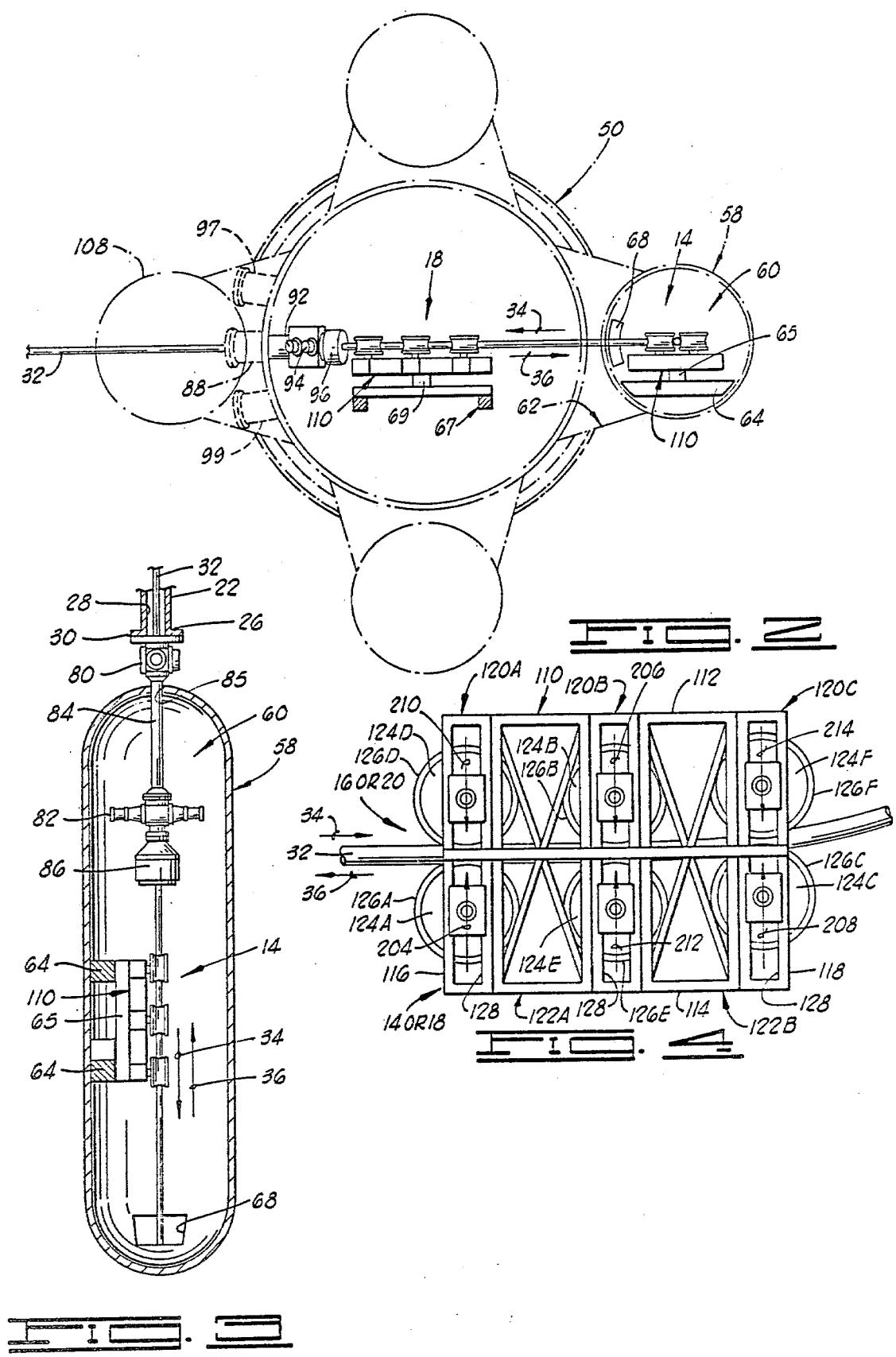

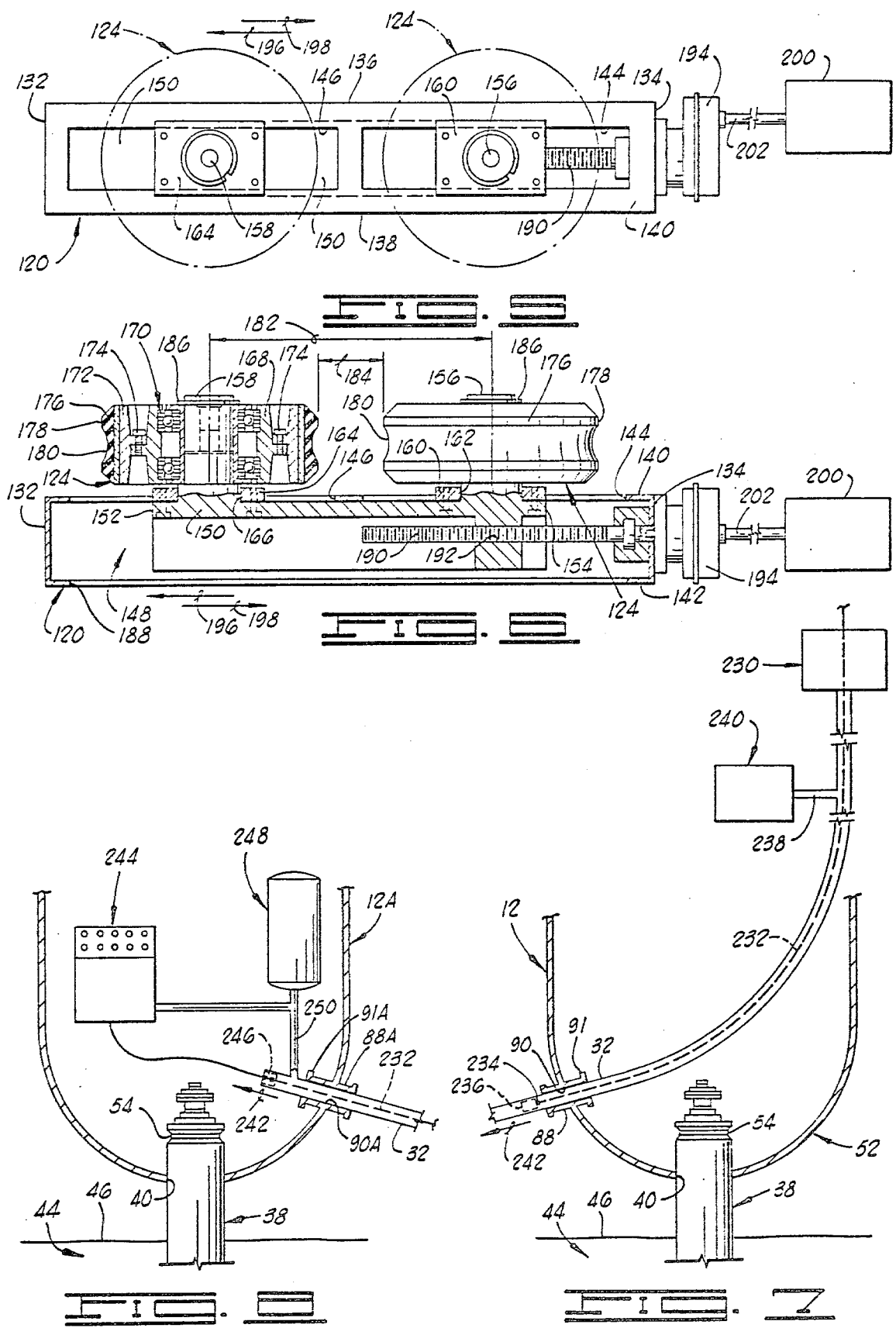

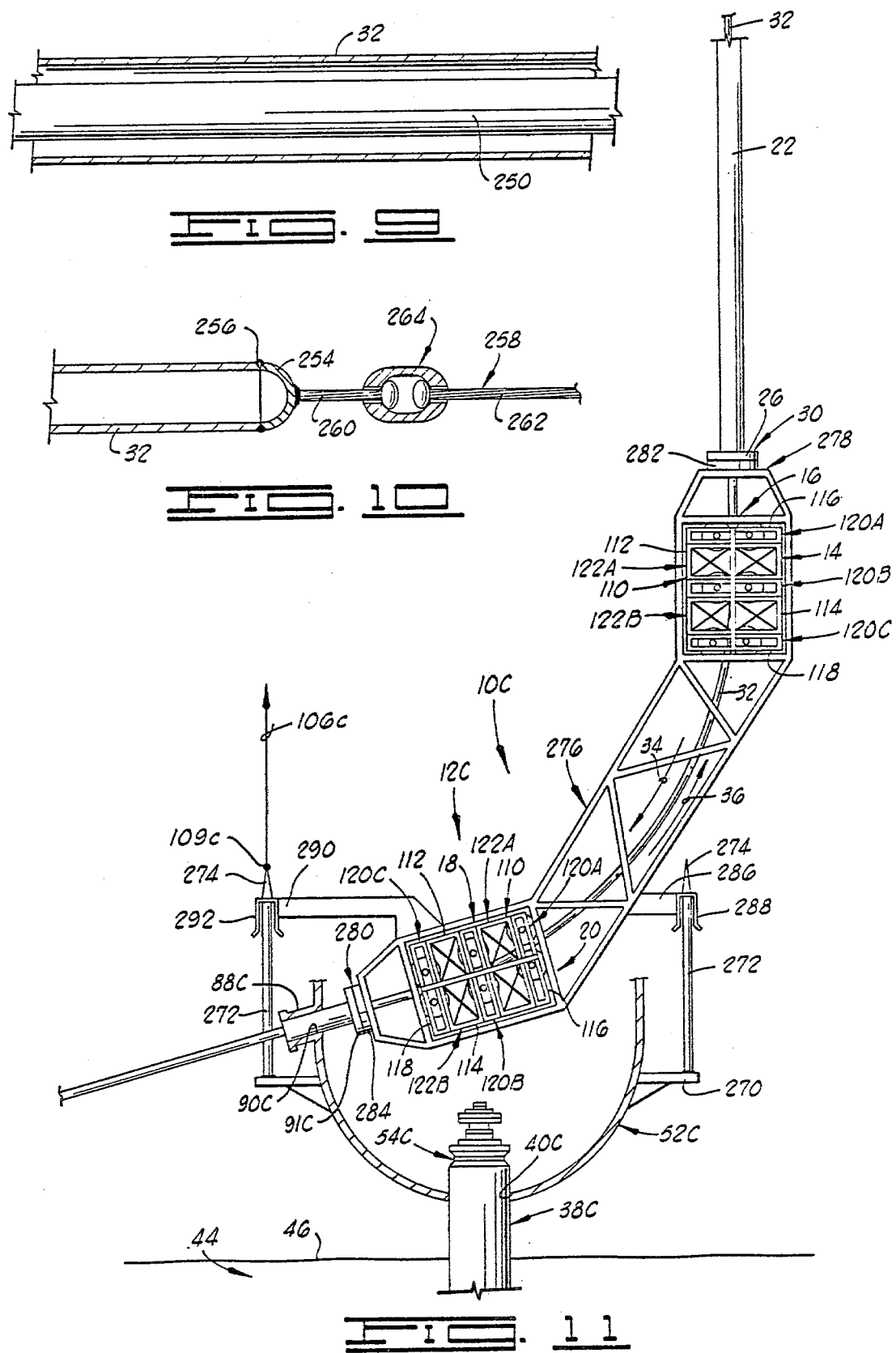

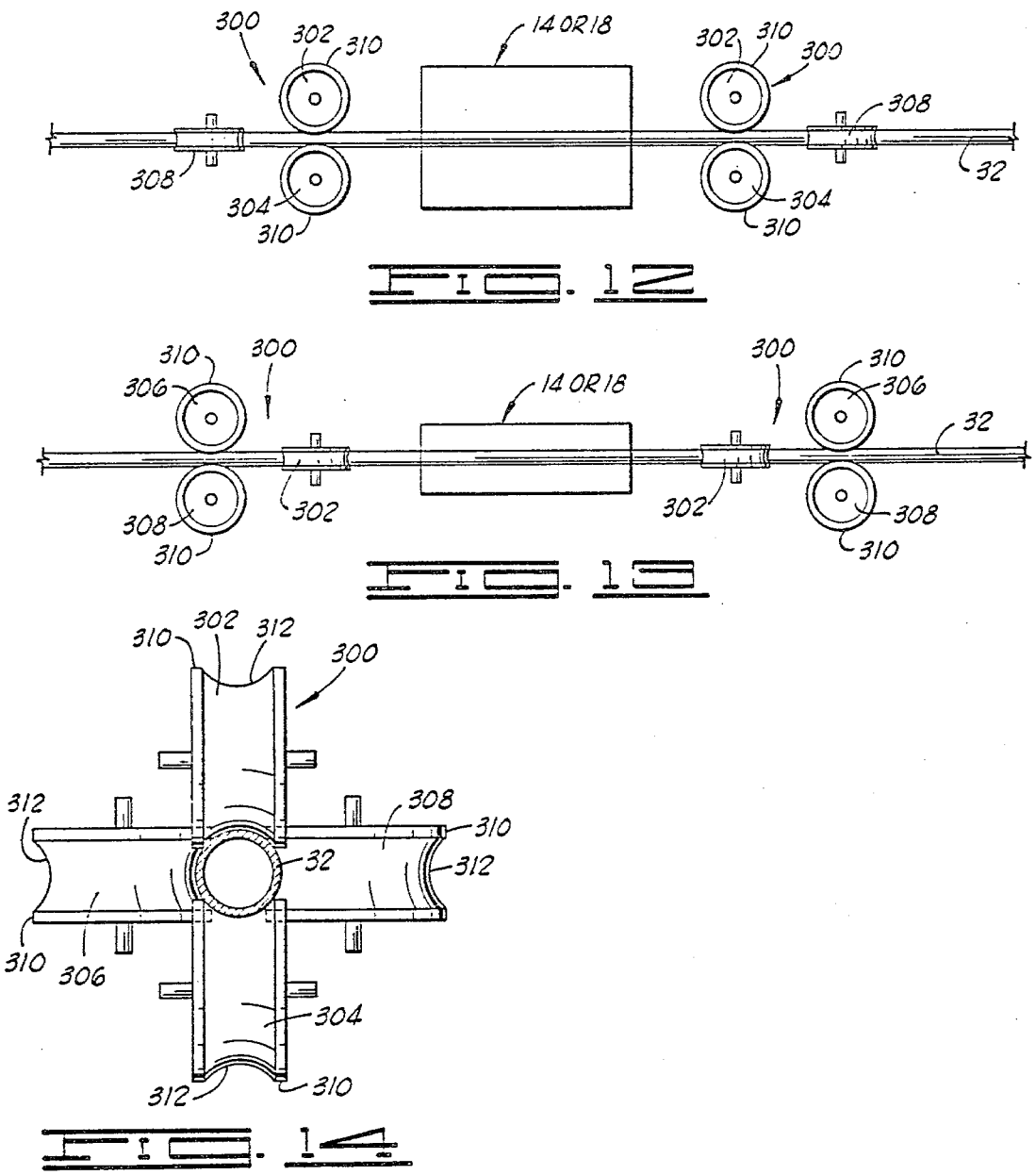

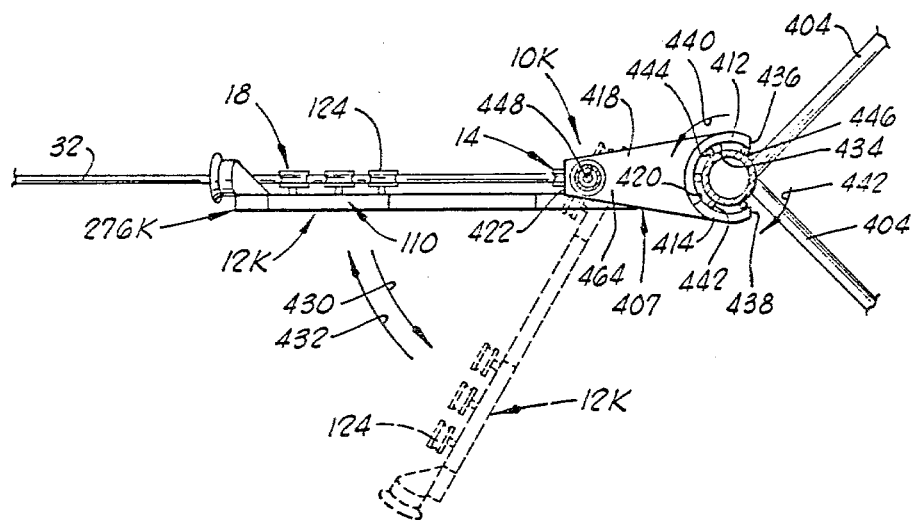
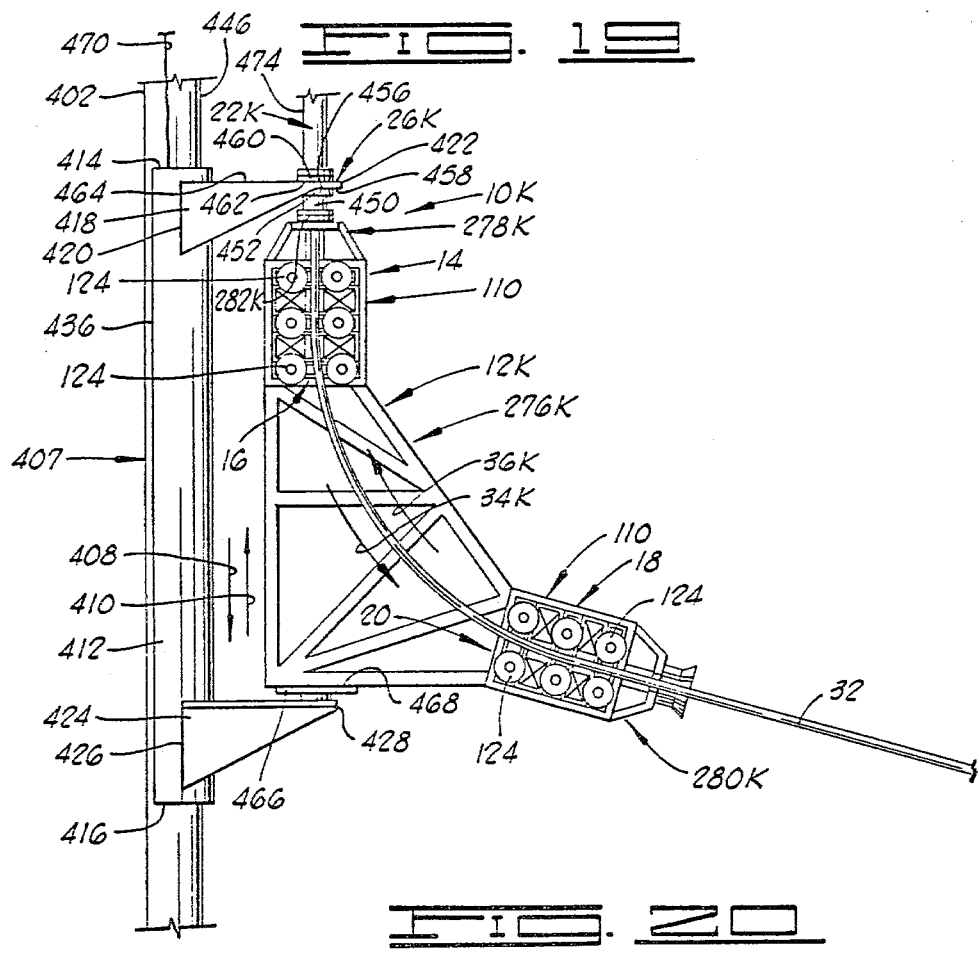

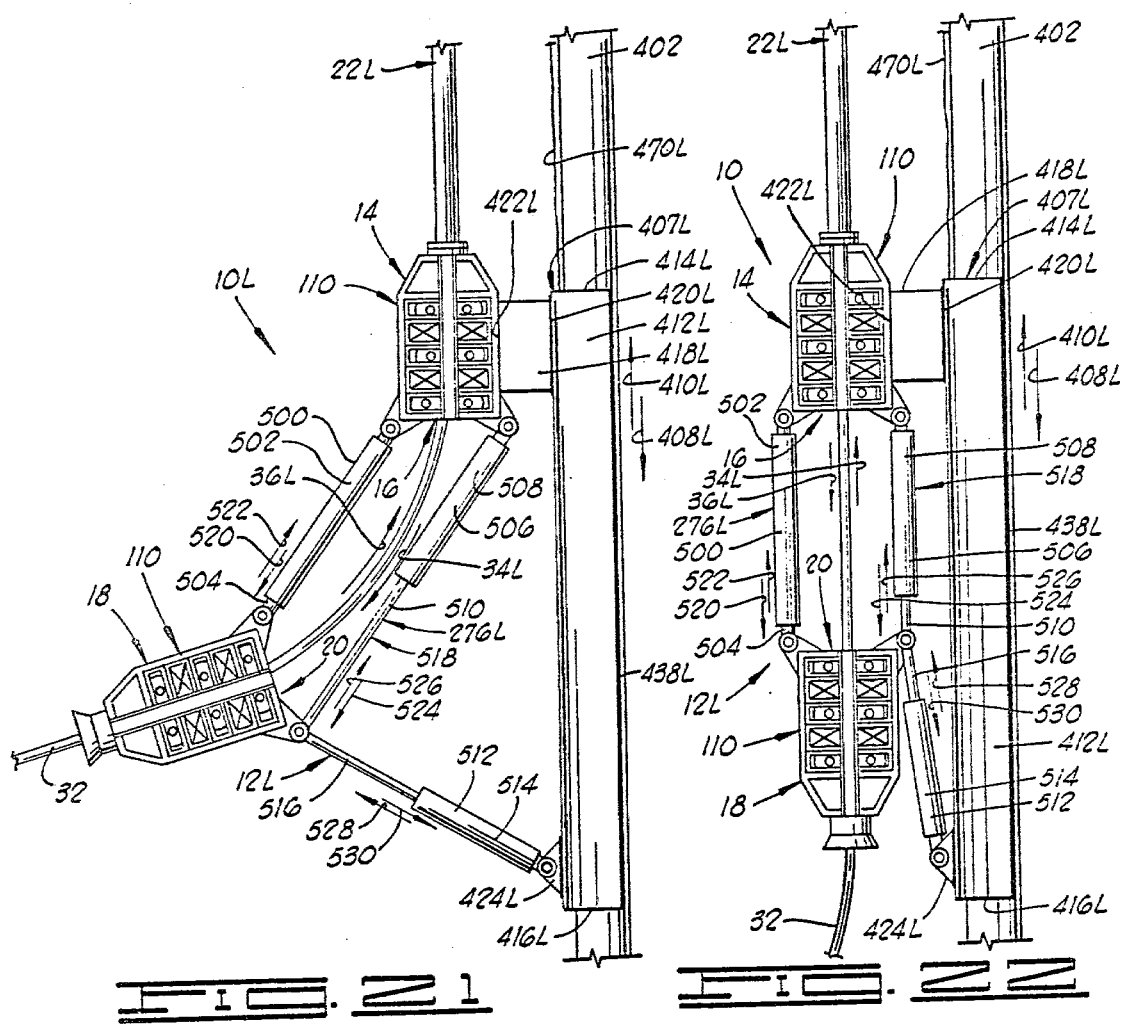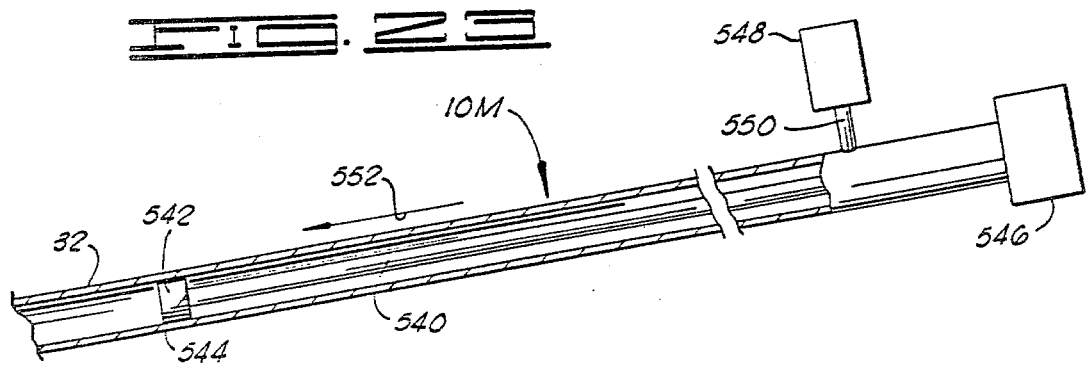

SUBMERSIBLE PIPE INSTALLATION SYSTEMS

This is a division, of application Ser. No. 733,377, filed Oct. 18, 1976, now U.S. Pat. No. 4,095,437.

BACKGROUND OF THE INVENTION

1. Field of the Invention

The present invention relates generally to systems associated with the drilling, completing and depleting of underwater wells, such as oil, gas or the like, and, more particularly, but not by way of limitation, to systems for forming and installing pipes beneath the surface of a body of water.

2. Brief Description of the Prior Art

It has been the practice for a number of years to use drilling rigs in the Gulf of Mexico and the oceans for the purpose of drilling and completing oil and gas wells and the like. Early offshore rigs were adapted to rest on the floor or bottom of a body of water and drill in a so-called "sit on bottom" position. Thereafter, floating rigs were developed which could drill while floating. While this permitted the drilling of wells in water depths on the order of 1,000 feet or more it left substantial problems such as how to convey fluid products to the surface, for example.

For commercial reasons, when wells are drilled in deeper water, it is desirable to provide an underwater oil or gas collecting station and to convey the oil or gas from a number of wells to such collecting station from whence it is conveyed to a surface collection station.

Moreover, it is not always commercially practical to use divers at such depths because of the limited time that they can remain at such depths, the cost of sophisticated support equipment required, as well as the relatively high salaries of the various personnel involved.

A major problem in perfecting such a deep water collecting system is that of laying and installing the marine pipelines to interconnect the wells with the underwater collection station. Further, various problems are encountered in making the terminal pipeline connections underwater, such as the problems associated with the alignment of the pipelines to be connected, for example. U.S. Pat. No. 3,754,404 discloses a method for interconnecting offshore with other offshore, as well as onshore, installations utilizing a submersible chamber and a series of buoys and wire lines for stringing and pulling the flowline pipe to interconnect such stations.

U.S. Pat. No. 2,548,616 discloses a pipe straightener comprising a plurality of roller motor driven roller elements and a pipe bender comprising a plurality of adjustable roller elements for use in passing a pipe string into a borehole and for use in withdrawing the pipe string from the borehole.

U.S. Pat. No. 3,595,312 disclosed a method and apparatus for installing offshore pipelines wherein the pipe was moved through a curved tube or J-tube shaped to change the direction of the pipe from vertical to horizontal, the pipe exiting the J-tube extending along the floor of a body of water. In one form, rollers were included in the J-tube for reducing friction.

BRIEF DESCRIPTION OF THE DRAWINGS

FIG. 2 is a partial plan view of the pipe forming system of FIG. 1, showing the support structure of FIG. 1 in dashed-lines.

FIG. 3 is an elevational view of a portion of the pipe forming system of FIG. 1, including a sectional view of a portion of the support structure of FIG. 1.

FIG. 4 is an enlarged elevational view of a typical first or second forming assembly of the pipe forming system of FIG. 1.

FIG. 5 is an enlarged elevational view of a typical support frame portion of the first or second forming assembly shown in FIG. 4.

FIG. 6 is a partial elevational, partial sectional view of the support frame portion of FIG. 5.

FIG. 7 is a diagrammatic view illustrating the installation of an electrical cable or other flexible member through a pipe in accordance with the present invention.

FIG. 8 is a diagrammatic view illustrating the installation of an electrical cable and a utility fluid line at a support structure.

FIG. 9 is a fragmentary view illustrating one pipe installation constructed in accordance with the present invention.

FIG. 10 is a fragmentary view illustrating another pipe installation arranged in accordance with the present invention.

FIG. 11 is a diagrammatic, partial sectional, partial elevational view showing a pipe forming system, similar to FIG. 1, but, mounted on a modified support structure.

FIG. 12 is a side elevational view of a pair of shaping roller assemblies disposed near a forming assembly.

FIG. 13 is a plan view of the system shown in FIG. 12.

FIG. 14 is a diagrammatic end view of a portion of the system shown in FIGS. 12 and 13.

FIG. 19 is a plan view of the pipe forming system of FIGS. 17 and 18, the pipe forming system being shown in FIG. 19 in one operative position in solid-lines and in one other operative position in dashed-lines.

FIG. 20 is a side elevational view of the pipe forming system of FIGS. 17, 18, and 19.

FIG. 21 is a side elevational view of still another embodiment of the pipe forming system of the present invention.

FIG. 22 is a side elevational view of the pipe forming system of FIG. 21 shown in a position for removing the pipe forming system from operative engagement with the pipe.

FIG. 23 is a diagrammatic, partial sectional, partial elevational view illustrating the installation of one pipe through another pipe in accordance with the present invention.

DESCRIPTION OF THE PREFERRED EMBODIMENTS

Figure 1:
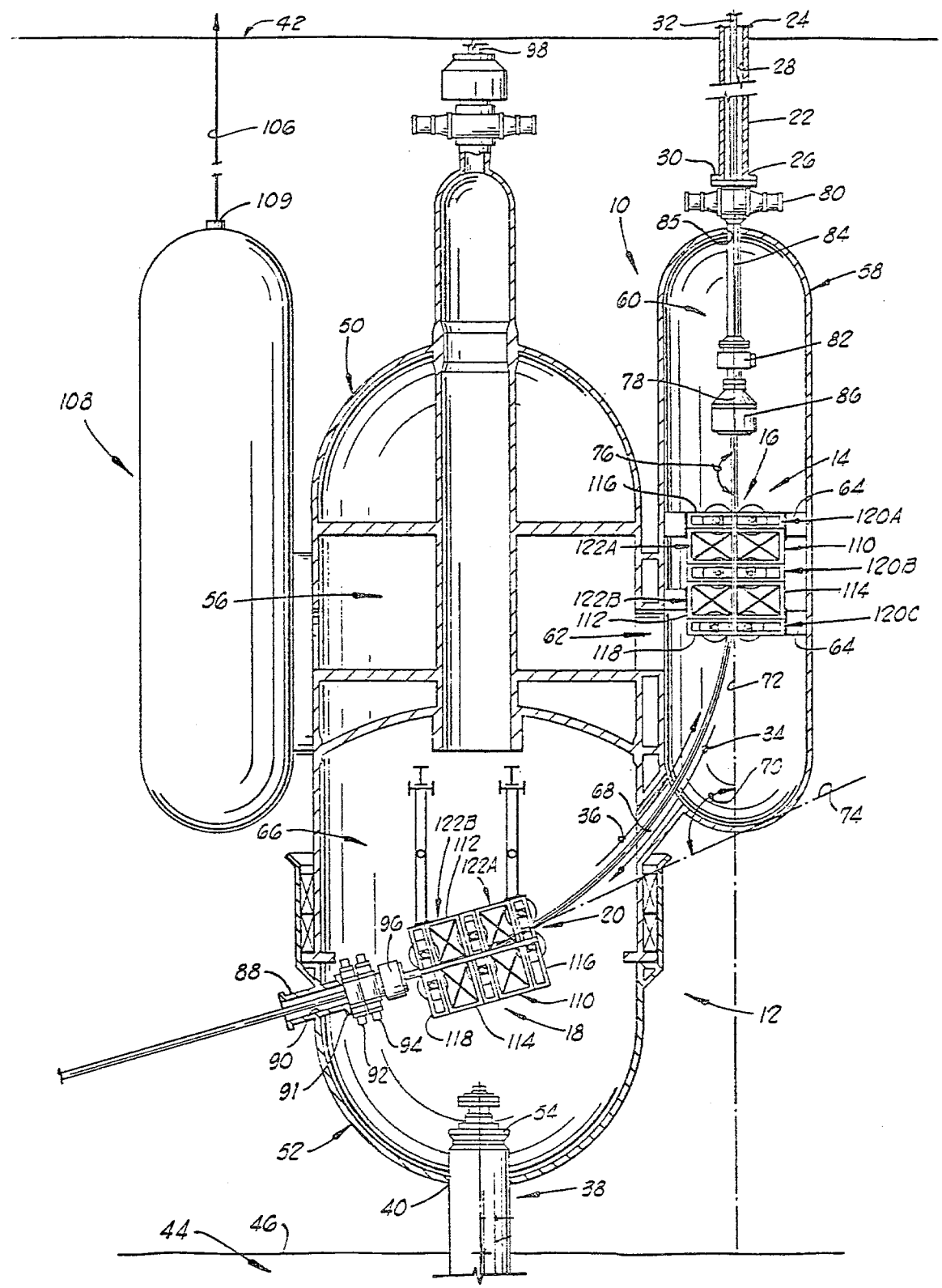
FIG. 1 is a diagrammatic, partial section, partial elevation view showing the pipe forming system of the present invention mounted in an operating position on one form of a support structure.

Referring to the drawings in general and to FIGS. 1, 2 and 3 in particular shown therein and designated via the general reference numeral 10 is a pipe installation system which generally includes: a support structure 12; a first forming assembly 14, which is movably connected to the support structure 12 and includes a portion forming a pipe passageway 16; a second forming assembly 18, which is movably connected to the support structure 12 and includes a portion forming a pipe passageway 20; and a riser 22, having a first end 24, a second end 26 and an opening extending therethrough intersecting the ends 24 and 26 and defining a pipe passageway 28, the riser 22 providing a fluid-tight pipe passageway 28 in a preferred embodiment. The riser 22 is connected to the support structure 12 at a connection 30 and the second end 26 of the riser 22 is disposed generally near the pipe passageway 16 of the first forming assembly 14. The first and the second forming assemblies 14 and 18 are positioned on the support structure 12 so that a pipe (a pipe 32 being shown in the drawings, for example) is passable through the pipe passageways 16, 20 and 28 in a first direction 34 and in a generally opposite, second direction 36 during the operation of the pipe installation system 10.

In general, the pipe installation system 10 is constructed to be submersed in a body of water and connected to a base 38 at a connection 40 (shown in FIG. 1), the base 38 being anchored or otherwise securely supported in the floor of the body of water (a body of water being diagrammatically illustrated in FIG. 1 with a surface 42 and a floor 44, having a floor surface 46, for example). The base 38 extends a distance above the floor surface 46. The pipe installation system 10 is connected to the base 38 beneath the surface 42 of the body of water in one assembled position of the pipe installation system 10 submersed in the body of water. In this position, a portion of the riser 22, generally near the first end 24 thereof, extends a distance generally above the surface 42 of the body of water and the riser 22 extends a distance below the surface 42 into the body of water terminating with the second end 26 of the riser 22, as illustrated in FIG. 1.

The pipe installation system 10 is constructed and utilized for installing pipe near the floor surface 46 from a vessel or other structure (not shown) located near the surface 42 of the body of water. During the operation, the pipe 32 is inserted through the first end 24, into the opening in the riser 22 and passed through the pipe passageway 28 in the first direction 34. The pipe 32 is passed from the riser 22 pipe passageway 28 into the pipe passageway 16 of the first forming assembly 14 and, as the pipe 32 is passed in the first direction 34 through the pipe passageway 16, the pipe 32 is engaged by portions of the first forming assembly 14 for causing the portions of the pipe 32 passing through the first forming assembly 14 to be formed in predetermined radii. The pipe 32 is passed from the pipe passageway 16 into the pipe passageway 20 of the second forming assembly 18 and, as the pipe 32 is passed in the first direction 34 through the pipe passageway 20, the pipe 32 is engaged by portions of the second forming assembly 18 for causing the portions of the pipe 32 passing through the second forming assembly 18 to be formed in predetermined radii. The forming assemblies 14 and 18 cooperate to form the pipe 32 through predetermined forming angles, and a particular forming angle is determined via the orientation of the forming assemblies 14 and 18 relative to each other. The first and the second forming assemblies 14 and 18 each are constructed so that the pipe 32 is also passable through the pipe passageways 16 and 20 in the second direction 36.

The forming assemblies 14 and 18 are each positionable for forming the portions of the pipe 32 passing therethrough in predetermined radii, and the forming assemblies 14 and 18 are positionable with respect to each other for forming the portions of the pipe 32 passing through the forming assemblies 14 and 18 through predetermined forming angles, the forming assemblies 14 and 18 cooperating to form the portions of the pipe 32 passing therethrough in predetermined radii through predetermined forming angles. Thus, the first forming assembly 14 and the second forming assembly 18 are each movably connected to the support structure 12 so the positions of the forming assemblies 14 and 18 are selectively changeable for selectively changing the orientation of the forming assemblies 14 and 18 relative to each other, thereby selectively changing the forming angle through which the pipe 32 is formed as the pipe 32 passes through the forming assemblies 14 and 18.

In the operational embodiment shown in FIGS. 1, 2 and 3 the support structure 12, more particularly, includes: an underwater chamber 50, which is mounted on a platform 52. In this embodiment, the base 38, more particularly, comprises a wellhead 54, which projects a distance above the floor surface 46 of the body of water and through a portion of the platform 52. The platform 52 is connected to the wellhead 54 at the connection 40 and the platform 52 is supported generally above the floor surface 46 via the wellhead 54. The wellhead 54 comprises a portion of an offshore well and is submersed below the surface 42 of the body of water. A seal member (not shown) is disposed between the chamber 50 and the platform 52 and portions of the seal member sealingly engage the chamber 50 and the platform 52 for providing a relatively fluid-tight seal therebetween. The chamber 50 and the platform 52 cooperate to provide an enclosed, substantially dry atmosphere, preferably at low pressure, working environment for workmen.

The chamber 50 is provided with a fluid-tight compartment 56 located generally within the upper portion of the chamber 50 within which workmen may be housed when the chamber 50 is being lowered into engagement with platform 52. After such engagement, water is removed from the lower portion of the chamber 50 and the platform 52 after which the workmen may decend into the lower portion, through a hatched passageway (not shown), of the chamber 50 and into the platform 52 to perform work on the wellhead 54 and the like. It will be understood, of course, that the compartments can be of varying shapes and sizes, as desired. Furthermore, a plurality of compartments may be included in chamber 50.

The chamber 50, as illustrated in FIGS. 1, 2 and 3, includes at least one auxiliary chamber 58 (one additional numbered auxiliary chamber being shown in FIG. 1 and two unnumbered auxiliary chambers being shown in FIG. 2, for example), which is connected to the outer surface of the chamber 50. The auxiliary chamber 58 substantially encompasses a space 60. A passage 62 is connected between the chamber 50 and the auxiliary chamber 58, the passage 62 being shaped to provide communication between the compartment 56 of the chamber 50 and the space 60 of the auxiliary chamber 58. The passage 62 provide access for workmen to move between the compartment 56 of the chamber 50 and the space 60 encompassed by the auxiliary chamber 58.

With respect to the utilization of the pipe installation system 10 in cooperation with the particular support structure 12 shown in FIGS. 1, 2 and 3, the first forming assembly 14, more particularly, is disposed within the space 60 defined via one of the auxiliary chambers 58 and is removably and positionably affixed to the auxiliary chamber 58 via a plurality of braces 64 via a swivel connection 65 for example. The second forming assembly 18, more particularly, is removably and positionably supported within a portion of the platform 52, generally within a space 66 formed between a lower portion of the chamber 50 and the platform 52 via a structure 67, the second forming assembly 18 being connected to the structure 67 via a swivel connection 69 for example. The second forming assembly 18 is removably supported within the space 66, so it may be removed from the inner portions of the chamber 50 and the platform 52 for storage outside the support structure 12 when the chamber 50 is being utilized for purposes other than forming pipe at the wellhead or other underwater station. A fluid-tight pipe passageway 68 is connected between the auxiliary chamber 58 and the chamber 50 for providing communication between the spaces 60 and 66 and, more particularly, for providing a communication path for the pipe 32 passing from the first forming assembly 14 and into the second forming assembly 18.

With respect to the specific support structure 12 shown in FIGS. 1, 2 and 3, the first forming assembly 14, more particularly, is adjusted to form the pipe 32 passing therethrough at an angle 70 of about 90 degrees, the angle 70 being the angle between a centerline axis 72 of the pipe passageway 16 through the first forming assembly 14 and a centerline axis 74 of the pipe passageway 20 through the second forming assembly 18. The angle 70 is determined via the orientation (angular disposition) of the first and the second forming assemblies 14 and 18. The riser 22 is oriented with respect to the first forming assembly 14 such that the centerline axis 72 of the pipe passageway 20 extends at an angle 76 with respect to a centerline axis 78 of the opening 28 through the riser 22.

Assuming the pipe 32 is to be passed in a substantially vertical direction through the riser 22 pipe passageway 28 and the pipe 32 is to be passed from the second forming assembly 18 along a path oriented at about 90 degrees with respect to the riser 22 centerline axis 78 for installing the pipe along a portion of the floor surface 46 beneath the surface 42 of the body of water, then, the angle 70 is about 90 degrees and the angle 76 is about 180 degrees. In the last-mentioned operational embodiment, the pipe 32 is formed at an angle 70 of about 90 degrees via the first forming assembly 14 and the bent or formed pipe 32 substantially is straightened or otherwise formed as desired via the second forming assembly 18 so the pipe 32 passed from the second forming assembly 18 extends along a path substantially parallel to the floor surface 46.

In some applications, it may be desirable to operate the forming assemblies 14 and 18 such that the portion of the pipe 32 passed from the second forming assembly 18 and extending along a path generally parallel to the floor surface 46 includes one or more portions (not shown) formed on radii providing curved sections. The curved section portions of the pipe 32 provided relief of undesirable forces acting on the pipe 32, such as those forces resulting from thermal expansion and contraction due to differences between the temperature levels of the fluid passing through the pipe 32 and the environment (body of water, for example) surrounding the pipe 32, for example.

As mentioned before, the first and the second forming assemblies 14 and 18 are each constructed so that the pipe 32 is passable through the pipe passageways 16 and 20 in the second direction 36. With respect to the one particular operational embodiment referred to before and when the pipe 32 is to be passed through the pipe passageways 16 and 20 in the second direction 36, the second forming assembly 18 is adjusted to form the portions of the pipe 32 passing therethrough at the angle 70, and the first forming assembly 14 is adjusted to form the portions of the pipe 32 passing therethrough in a manner such that the pipe 32 is passable from the first forming assembly 14 into and through the riser 22 pipe passageway 28. In other words, in this particular application, the second forming assembly 18 bends or forms the pipe 32 passing therethrough in the second direction 36 at the angle 70 of about 90 degrees and the first forming assembly 14 essentially straightens the portions of the pipe 32 passing therethrough in the second direction 36, the pipe 32 then being passed through the riser 22 pipe passageway 28 in the second direction 36.

The top of a blind ram type of blowin preventer 80 equipped with blind or complete shut-off rams is connected to the second end 26 of the riser 22 and is disposed outside the space 60 defined via the auxiliary chamber 58, the riser 22 extending upwardly generally toward the surface 42 of the body of water. A ram type blowin preventer 82, equipped with pipe rams sized to fit the pipe 32, is connected to the blowin preventer 80 via a conduit 84. The conduit 84 extends through an opening 85 formed through the auxiliary chamber 58 and into the space 60, thereby disposing the blowin preventer 82 generally within the space 60, the conduit 84 being sealingly secured to the auxiliary chamber 58 in any suitable manner, such as by welding, for example, for preventing fluid from entering the space 60. An annular blowin preventer 86 is connected to the ram type blowin preventer 82 and is disposed within the space 60. It should be noted that the blowin preventers 80, 82 and 86 may all be disposed within the space 60 or outside the auxiliary chamber 58 if desired in a particular application, the particular disposition shown in the drawings representing one preferred embodiment.

A conduit 88 extends through an opening 90 in the platform 52 and the conduit 88 is sealingly secured to the platform 52 in any convenient manner, such as by welding, for example, one end of the conduit 88 being disposed within the space 66 and the conduit 88 providing communication between the space 66 and the water environment outside the support structure 12. A flange 91 or other form of connector (not shown) is formed on the end of the conduit 88 which is disposed in the space 66. A blind ram type of blowin preventer 92 equipped with blind or complete shut-off rams is connected to the flange 91 on the end of the conduit 88. A ram type blowin preventer 94 equipped with pipe rams sized to fit pipe 32 is connected to the blowin preventer 94. An annular blowin preventer 96 is connected to the ram type blowin preventer 94. In one preferred form, as shown in FIG. 1, each of the blowin preventers 92, 94 and 96 is disposed within the space 66, although the blowin preventers 92, 94 and 96 may be disposed in the water environment outside the platform 52 if desired in some particular application, the particular disposition of the blowin preventers 92, 94 and 96 shown in FIG. 1 being one preferred disposition.

In one embodiment, it is contemplated that commercially available "blowout" preventers may be utilized for the blowin preventers 80, 82, 86, 92, 94 and 96, except in this embodiment, the blowout preventers are installed for a different purpose with respect to the commercially intended installation, since blowout preventers are designed normally for installation on oil-wells and the like to prevent fluid from blowing out from a well and, in the present invention, the blowin preventers are utilized to prevent fluid from flowing into the interior of the chambers 50 and 58 and space 66. In the present invention, the annular blowin preventers 86 and 96 are constructed to effect an inward sealing action for sealingly engaging the portions of the pipe 32 or other materials, such as a wire line, for example, passing therethrough and the annular blowin preventers 86 and 96 are utilized when the spaces 60 and 66 of the chambers 50 and 58 are to be maintained relatively dry or fluid-free. Blowout preventers of the type commercially available from such manufacturers as Hydril Company, and designated by model number MSP-2000, for example, may be utilized as the annular blowin preventers 86 and 96. The ram type blowin preventers 82 and 94 are constructed to sealingly engage the pipe 32 passing therethrough and are also utilized to effect a seal for preventing fluid from entering the spaces 60 and 66 of the chambers 50 and 58 particularly when it is desired to effect repairs or maintenance on the annular blowin preventers 86 and 96, such as when changing worn seal elements in the annular blowin preventers 86 and 96, for example. Blowin preventers of the type commercially available from such manufacturers as Cameron Iron Works, Inc. and designated by model number Type U, for example, may be utilized as the blowin preventers 82 and 94. The blind ram blowin preventers 80 and 92 are constructed to sealingly close the riser 22 pipe passageway 28 and the opening through the conduit 88, respectively, and are utilized to seal fluid from entering the spaces 60 and 66 of the chambers 50 and 58 when repairing, maintaining or installing the blowin preventers 82, 86, 94 and 96, such as when changing the seal elements of the ram type blowin preventers 82 and 94 to sealing engage a different pipe having a different outside diameter, or when installing the blowin preventers 82, 86, 94 and 96, or at any other time when it is desired to seal the interiors of the chambers 50 and 58 from the surrounding fluid environment and pipe is not being run through pipe installation system 10, for example. Blowin preventers of the type commercially available from such manufacturers as Cameron Iron Works, Inc., and designated by model number Type U, for example, may be utilized as the blowin preventers 80 and 92. In one form, the blind ram blowin preventers 82 and 94 also include means for cutting the pipe 32 disposed therethrough; however, it is contemplated that such cutting capability of the blowin preventers 82 and 94 would be utilized for emergency use only and the system would include other conventional cutting means (not shown) for cutting the pipe 32 during the normal operation. The blowin preventers 80, 82, 86, 92, 94 and 96 are preferably constructed to be actuated for sealing engagement from a remote location, such as via a hydraulic type control system (not shown), for example. Further, the blowin preventers 82, 86, 94 and 96 each, either singularly or in combination, function to accomplish the stripping requirement described in U.S. Pat. No. 3,754,404.

A removable pipe plug (not shown) is disposed in the opening through the conduit 88 to prevent fluid from entering the space 66 and the chambers 50 and 58 through the conduit 88 prior to the installation of blowin preventers 92, 94 and 96 and the forming assembly 18. After the blind ram blowin preventer 92 has been connected to flanged end of the conduit 88, as shown in FIG. 1, the pipe plug can be removed and the blowin preventer 92 functions to seal the conduit 88 during the installation of the other blowin preventers 94 and 96 and the second forming assembly 18. The blind ram blowin preventer 80 prevents fluid from entering the chamber 58 via the conduit 84, and the other blowin preventers 82 and 86 and the first forming assembly 14 can be installed or removed at various times depending upon the particular operation.

The present system, as shown in FIG. 1, is suitable for installing pipe at underwater depths to 250 feet and greater. After completion of drilling all or a portion of the well utilizing the wellhead 54 and the platform 52, the chamber 50 is lowered from a surface vessel (not shown) by a pipeline 98 and sealingly mounted in engagement with platform 52. It will be appreciated that riser 22 may be run simultaneously with pipeline 98 or independently after chamber 50 is run, and the riser 22 then is connected to the blowin preventer 80. After the chamber 50 has been sealingly engaged with the platform 52, the blind ram blowin preventer 80 is operated as may be required and water is removed from the chamber 50, the auxiliary chambers 58 and the riser 22, to establish a relatively dry and preferably low pressure environment therein. Thereafter, the workmen descend into the lower portion of the chamber 50, and install the blowin preventer 92. The pipe plug (not shown) in the conduit 88 is removed after the blowin preventer 92 has been closed. The workmen then secure the forming assemblies 14 and 18 in an operative position along with the remaining components of the pipe installation system 10.

Thereafter, pipe 32 is lowered downwardly in the first direction 34 from the surface vessel (not shown) through riser 22 pipe passageway 28. In one preferred embodiment, the riser 22 has a water-tight construction and one end of the riser 22 extends above the surface 42 of the body of water to prevent water from entering the passageway 28. As shown on the drawings, the pipe 32, after passing through the blowin preventers 80, 82 and 86, passes through the first forming assembly 14 wherein the pipe 32 is formed in a predetermined radius for passing the pipe from the first forming assembly 14 through the passage 68 and into the second forming assembly 18. The passageway 68 is only a passageway, and it does not function as a guide to aid in forming the pipe 32. The portions of the pipe 32 passing through the second forming assembly 18 essentially are straightened or formed as otherwise desired and the pipe 32 is passed from the second forming assembly 18 through the blowin preventers 92, 94 and 96 and through the conduit 88, the blowin preventers 94 and 96, either singularly or in combination, maintaining a fluid-tight seal about the portions of the pipe 32 passing therethrough to maintain the sealed integrity of the chamber 50.

The leading end of the pipe 32 preferably is plugged. A flexible member such as a wire line is attached to the leading end preferably prior to feeding the pipe 32 from the second forming assembly 18 into the blowin preventers 92, 94 and 96, and the wire line extends generally along the floor surface 46 of the body of water to a power means, such as a winch, for example (not shown) located at some remote installation. Thereafter, the winch is activated to pull the wire line and leading end of the pipe 32 to a remote structure or station (not shown).

Thereafter, the pipe 32 is pressure tested to make certain that the pipe 32 still has integrity and has not been broken or otherwise damaged in the course of the pulling operation. The pipe 32 also can be tested for distortion, if desired. The blowin preventers 94 and 96, either singularly or in combination, are closed inwardly on the pipe 32 when the forming of the pipe via the forming assemblies 14 and 18 occurs in de-watered chambers 50 and 58. The riser 22, after having been drained if necessary, prevents the flow of water into chambers 50 and 58 thereby eliminating the need for closing the blowin preventers 82 and 86. The blowin preventers 82 and 86 are available for closing in the event of damage or otherwise loss of fluid (water) tight integrity of the riser 22. This feature of the riser 22 reduces the wearing of the sealing elements of the blowin preventers 82 and 86 and further reduces the chances of inadvertently flooding the chambers 50 and 58 which could result in disastrous consequences. It will be appreciated that the foregoing procedure, utilizing blowin preventers 80, 82, 86, 92, 94 and 96 and the riser 22 affords the utmost of safety with respect to inadvertently flooding spaces 60 and 66 while making pipe installations, as compared to such stripping operations as described in U.S. Pat. No. 3,754,404, for example. Yet, the procedure of the present invention still requires the pipe 32 to be in slidable or rubbing contact with the seal members in the blowin preventers 94 and 96 and possibly those in the blowin preventers 82 and 86 over nearly, if not all, the length of the pipe being installed. Such sliding contact causes wear and reduces the operating life of the sealing elements and increases the chances for inadvertently flooding spaces 60 and 66 which can lead to injury or possibly loss of life of workmen in these spaces. Use of remote controls for the forming assemblies 14 and 18 and the blowin preventers makes it possible for the workmen to leave these chambers while running the pipe 32 except for performing maintenance operations on equipment. Additionally, these features permit the flooding of the spaces 60 and 66 when running pipe 32 and further permits the complete opening of all blowin preventers and eliminating the wear problem altogether. Therefore, the present invention contemplates the inclusion of controls for remotely operating the forming assemblies 14 and 18 and blowin preventers 80, 32, 86, 92, 94 and 96 in one embodiment. Further, after pipe 32 has been run and after the chambers 50 and 58 have been resealed, if necessary, and conduit 88 has been sealed around pipe 32 (sealing element not shown) and the chambers have been dewatered, the blowin preventers 92, 94 and 96 are now ready to be removed.

Thereafter, workmen sever the pipe 32 and the unused pipe 32 then is pulled back upwardly in the second direction 36 through the forming assemblies 14 and 18, the second forming assembly 18 being adjusted to bend the pipe 32 in a desired radius and the first forming assembly 14 essentially straightening the pipe 32 for passing the unused pipe 32 through the riser 22 back to the surface vessel or the like (not shown). It should be noted that, in some applications, the unused pipe 32 will be pulled back in the second direction 36 only a distance sufficient to remove the unused pipe 32 from the chamber 50 and dispose such unused pipe 32 generally within the auxiliary chamber 58. Further, the forming assemblies 14 and 18 can be utilized to pull or move all or a portion of the pipe 32 in the second direction 36 back through the forming assemblies 14 and 18 for withdrawing the pipe 32 from the pipe installation system 10.

Blowin preventers 92, 94 and 96 are removed from flange 91 and the terminal end of pipe 32 is connected to the well or other apparatus. It is a feature of this invention that such terminal connection is made in a substantially dry atmosphere using conventional means such as welding, for example. As will be appreciated, this invention also permits utilization of the chamber 50, or like chambers, at other underwater stations to make terminal connections or to connect other electrical or hydraulic control lines, for example.

It will be appreciated that the foregoing procedure may be repeated to install a multiplicity of pipelines as well as control lines (electrical, hydraulic and the like) between the two underwater stations (support structures) for example. For example, the forming assemblies 14 and 18 each can be movably positioned via the swivel connections 65 and 69, respectively, for passing the pipe through additional conduits 97 and 99 (shown in dashed-lines in FIG. 2). By the same token, a remote station may incorporate more than one conduit like the three conduits 88, 97 and 99 for receiving pipes, if desired in a particular application.

A signficant aspect of the present invention is the inclusion of the riser 22 through which the pipe 32 is passed into and through the forming assemblies 14 and 18. Without the riser 22 and without tension, the compressive stesses in the pipe 32 due to its own weight can be great enough to buckle the pipe 32 at some place generally between the surface 42 of the body of water or, in other words, between the installation generally near the surface 42 such as a vessel, for example, and the chambers 50 and 58, for example, as the pipe 32 is passed through the forming assemblies 14 and 18. Further, in the absence of the riser 22, a pulling means, such as, for example, the wire line (not shown) whidh is attached to the end of the pipe 32 for pulling the pipe 32, would be pulled under tension in the first direction 34 toward the installation (not shown) remotely located with respect to the support structure 2, at the same time the pipe is maintained under tension upwardly generally in the second direction 36 and such opposing forces would result, not only in a higher pulling force on the leading end of the pipe 32, but also in relatively high bending moments in the chamber 50 and platform 52, at the connection of the platform 52 to the wellhead 54, in the base 38 and in higher soil stresses in the floor 44. The pulling forces can be reduced via the present invention utilizing the proper combination of compression and tension forces to provide the thrust to pass the pipe 32 through the forming assemblies 14 and 18.

The utilization of the riser 22 provides lateral stability to the pipe 32 which permits the application of a compressive force in pipe 32 when pipe 32 is being passed in the first direction 34. The use of compression in pipe 32 for thrusting pipe 32 through the forming assemblies 14 and 18 reduces or substantially eliminates the need for applying tensile force at the exit end of the second forming assembly 18 to provide the thrust. This feature reduces the strength requirement of the pulling means for moving the pipe along the sea floor to the extent of the reduction of such tensile thrust force.

The nature of the riser 22 requires an application of tensile force at the first end 24 of riser 22, such tensile force diminishing in magnitude (such reduction of the tensile force being generally equivalent to the weight of the riser 22 in water) along riser 22 from the first end 24 toward the second end 26. However, good practice generally requires that such tension force is not reduced to zero. This application of tensile force protects the riser 22 from environmental forces, such as current, surface vessel motion and the like, for example. The excess tension is supported by support structure 12 and produces a bending moment throughout the support structure 12, which can be most critical in the area of the base 38. Such bending moment may further increase soil stresses via base 38, possibly to the point of failure.

Compression in the pipe 32 reacted by the forming assemblies 14 and 18 tends to offset the bending moment resulting from the tension in the riser 22, as described before. The reduction or elimination of the tensile thrust force at the exit end of the second forming assembly 18 generally tends to be additive to the bending moment created by the tension in the riser 22 and thus the elimination or reduction of this tensile force is beneficial to the operation of the pipe installation system 10 of the present invention.

In addition to the foregoing, the moment in the chamber 50 and in the platform 52, at the connection of the platform 52 to the wellhead 54, and in the base 38, for example, can be reduced by connecting one end of a tension member 106, such as a wire line, for example, to the support structure 12, having a moment arm generally located on the opposite side of the chamber 58 with respect to the location of the connection of the riser 22 to the support structure 12. The tension member 106 extends from the support structure 12 to a structure, such as a vessel (not shown) located on or near the surface 42 of the body of water. For example, the tension member 106 can be connected to the top portion of an auxiliary chamber 108 at a connection 109, the auxiliary chamber 108 is being connected to the chamber 50 and disposed on the chamber 50 generally opposite the auxiliary chamber 58, as shown in FIGS. 1 and 2.

It should be noted that the reactions exerted on the chamber 50 by the compressive forces in the pipe 32 and possibly the tension force exerted by the riser 22 will vary during different phases of the operation of the pipe installation system 10. The moments referred to above also will vary during the operation. One advantage of the tension member 106 is that the force exerted on the support structure 12 can be adjusted, thereby permitting the moment to be controlled within limits during all phases of the operation of the pipe installation system 10.

Application of tension in the riser 22 and the tension member 106 increases the moments in the support structure 12, for example, in the area of the passageway 62, between the compartment 56 and the space 60, which may result in local design and fabrication problems. The application of tension in the riser 22 and the tension member 106 can be controlled to virtually eliminate bending moments in the connection 40, in the base 38 and the corresponding reactive loads in the floor 44 resulting from the pipe laying operation contemplated via the present invention. The design and fabrication of a suitable structure for reacting bending moments in the area of the passageway 62 is simpler, as compared with the design and fabrication problems of a suitable structure in the area of the lower portion of the support structure 12, the connection 40 and in the base 38. The design of the base 38 is dependent upon the soil strength and other characteristics of the floor 44. The sea floor 44 soil strengths vary radically and the methods for measuring such strengths are not precise and, therefore, it is prudent to minimize the soil load. Soil failure can result in the failure of the base 38 which results in problems of great magnitude.

The capability of the riser 22 to prevent buckling of the pipe 32 is dependent on the clearance between the inner peripheral surface defined via the opening 28 through the riser 22 and the outer peripheral surface of the pipe 32, and the compression force in the pipe 32. If this clearance is too large, the pipe 32 may buckle within the riser 22. However, this possible problem is eliminated by simply selecting the proper size of the riser 22 with respect to any particular size of the pipe 32. However, for convenience, the present invention also contemplates applications wherein the same riser 22 is utilized with different sizes of the pipe 32, at least within a certain range of pipe sizes, and, in this particular application, the clearance between the riser 22 and the pipes will not be optimum for all of the pipe sizes. In this last-mentioned application, properly spaced inserts, which may be removable, can be inserted within the opening 28 of the riser 22, each insert or bushing being sized and spaced to optimize the clearance relationship between the inner peripheral surface defined via the opening through each insert and the outer peripheral surface of any one of the several pipes to minimize the possibility of the pipe 32 buckling from the compression.

In summary, the various factors controlling the total moment of the system of the present invention utilizing the riser 22 are subject to design control and the utilization of the riser 22 permits the pipe installation system 10 to be constructed in a manner effecting a reduced total moment and a reduced tension force required to pull the pipe 32, as compared to a system without the riser 22. Further, the riser 22 provides a guide path for path 32 and functions to substantially reduce the possibilities of the pipe 32 buckling at some point generally between the surface 42 and the position where the pipe 32 enters the first forming assembly 14 by providing lateral support for pipe 32 while passing in the first direction 34.

In one embodiment, the leading end of the pipe 32 is sealingly closed and the pipe 32 is filled with air or gas. In this manner, the buoyancy of the portions of the pipe 32 extending through the body of water is increased, which reduces the effective weight of the pipe 32 in the body of water, thereby reducing the friction force between the pipe 32 and the floor surface 46 to facilitate the pulling or moving of the pipe 32 along the floor surface 46.

FORMING ASSEMBLIES

As shown in FIGS. 1 through 6, the first and the second forming assemblies 14 and 18 are constructed almost exactly alike, in one preferred form, and each of the forming assemblies 14 and 18 includes a frame assembly 110, having a first side 112, a second side 114, a first end 116 and a second end 118. The frame assembly 110 provides the structural support for the various components of the forming assemblies 14 and 18. As shown more clearly in FIG. 4, the frame assembly 110 includes at least two support frames 120 and at least one spacer frame 122, each spacer frame 122 being connected between two support frames 120 for spacing the support frames 120 a predetermined distance apart generally between the opposite ends 116 and 118 of the frame assembly 110.

At least two surfaces are supported on the frame assembly 110 for engaging the portions of the pipe 32 passing therethrough and the surfaces are spaced on the frame assembly 110 in predetermined orientations for forming the portions of the pipe 32 passing therethrough in a predetermined radii. More particularly and in a preferred embodiment, three surfaces are supported on the frame assembly 110 for engaging the portions of the pipe 32 passing therethrough in the first direction 34 and causing the pipe 32 to be formed in predetermined radii, and three other surfaces are supported on the frame assembly 110 for engaging the portions of the pipe 32 passing therethrough in the second direction 36 and causing the pipe 32 to be formed in a predetermined radii. With respect to this last-mentioned embodiment, two of three surfaces are positioned on the frame assembly 110 for engaging the portions of the pipe 32 passing therethrough and imposing a force on such portions in one direction, and one of the three surfaces is positioned on the frame assembly 110 for engaging the portions of the pipe 32 passing therethrough and imposing a force on such portions in a direction, generally opposite the direction of the force imposed via the first two mentioned surfaces.

Referring more particularly to the preferred embodiment of the present invention, a plurality of rollers 124 are supported on the frame assembly 110 and each roller 124 has an outer peripheral surface 126. As shown more clearly in FIGS. 1 and 3, six rollers 124 are supported on the frame assembly 110 (the six rollers being designated via the reference numerals 124A, 124B, 124C, 124D, 124E and 124F, and the outer peripheral surfaces of the rollers 124 are designated via the reference numerals 126A, 126B, 126C, 126D, 126E and 126F). The rollers 124A, 124B, and 124C, are positioned and oriented on the frame assembly 110 such that the outer peripheral surfaces 126A, 126B and 126C, respectively, engage the portions of the pipe 32 passing therethrough in the first direction 34, and the rollers 124D, 124E and 124F are each oriented and positioned on the frame assembly 110 such that the outer peripheral surfaces 126D, 126E and 126F, respectively, each engage portions of the pipe 32 passing therethrough in the second direction 36. The outer peripheral surfaces 126 of the rollers 124 define the surfaces, referred to before, for engaging the portions of the pipe 32 passing therethrough and forming such portions in predetermined radii.

As shown more clearly in FIG. 4, the rollers 124A and 124D are each positionably connected to the support frame 120A; the rollers 124B and 124E are each positionably connected to the support frame 120B; and the rollers 124C and 124F are each positionably connected to the support frame 120C.

As shown more clearly in FIGS. 4, 5 and 6, each support frame 120 has opposite ends 132 and 134, opposite sides 136 and 138, a first face 140 and a second face 142. A first channel 144 is formed through the first face 140 and extends generally between the opposite ends 132 and 134. A second channel 146 is formed through a portion of the first face 140 and extends generally between the opposite ends 132 and 134, the first channel 144 being disposed generally near the end 134 and the second channel 146 being disposed generally near the opposite end 132. The support frame 120 generally encompasses and defines an open space 148, and the first and the second channels 144 and 146 each intersect a portion of the open space 148.

A bar 150 is disposed generally within the open space 148 of the support frame 120. The bar 150 has opposite ends 152 and 154 and the bar 150 is supported within the open space 148, generally below the first and the second channels 144 and 146.

One end of a first shaft 156 is secured to the bar 150, generally near the end 154 thereof, and the first shaft 156 extends a distance from the bar 150, the first shaft 156 extending through and being disposed generally within the first channel 144. One end of a second shaft 158 is secured to the bar 150, generally near the end 152 thereof, and the second shaft 158 extends a distance from the bar 150, the second shaft 158 extending through and being supported generally within the second channel 146.

A first plate 160, having an opening 162 formed through a central portion thereof, is secured to the bar 150 and the first shaft 156 extends through the opening 162 (shown more clearly in FIG. 6). As shown more clearly in FIG. 5, portions of the first plate 160 slidingly engage portions of the first face 140 of the support frame 120, generally near the first channel 144, the engagement between the first plate 160 and the support frame 120 cooperating to movably support the bar 150 within the open space 148. A second plate 164, having an opening 166 extending through a central portion thereof, is secured to the first face 140 of the support frame 120. The second shaft 158 extends through the opening 166 in the second plate 164 and portions of the second plate 164 engage portions of the first face 140 of the support frame 120, generally adjacent to the second channel 146, the second plate 164 cooperating with the first plate 160 to support the bar 150 within the open space 148.

One of the rollers 124 is journally connected to the first shaft 156 and another of the rollers 124 is journally connected to the second shaft 158. The rollers 124 are each constructed exactly alike, and one typical roller 124 is shown in section in FIG. 6. Each roller 124 includes a hub 168, which is connected to one of the shafts 156 or 158 via a bearing assembly 170, each bearing assembly 170 journally supporting one of the hubs 168 on one of the shafts 156 or 158. Each roller 124 also includes a roller base 172 which is removably connected to the hub 168 via a plurality of fasteners 174.

An elastomeric member 176 is secured to the outer peripheral surface of each roller base 172 and each elastomeric member 176 extends annularly about one of the roller base 172. Each elastomeric member 176 has an outer peripheral surface and a recess 180 is formed in the outer peripheral surface 178, each recess 180 extending annularly about one of the rollers 124. Each of the recesses 180 is formed on a curve or radius for engaging a portion of the pipe 32.

When the elastomeric member 176 engages the pipe 32, the elastomeric member 176 is compressed, thereby temporarily elastically deforming portions of the elastomeric member 176 and increasing the surface area of the portions of the elastomeric member 176 engaging the pipe 32. The force exerted on the pipe 32 via the elastomeric member 176 is greatest near the central portion of the contact area between the elastomeric member 176 and the pipe 32 and the force decreases from the central portion toward the outer limit of the contact area between the elastomeric member 176 and the pipe 32 in directions parallel to an axially extending centerline of the pipe 32. If the portions of the rollers 124 engaging the pipe 32 were constructed of a nonelastomeric or solid material, each of the rollers 124 would engage the pipe 32 essentially at a point of contact or, if the portions of the rollers 124 engaging the pipe 32 were formed on a radius, then each roller 124 would engage the pipe essentially along a line of contact, the length of the line of contact depending upon the degree to which the roller 124 contact surfaces conforms to the outer peripheral surface of the pipe 32.

If the pipe 32 contains some deformity, such as a weld bead, for example, and the portions of the rollers 124 engaging the pipe 32 were constructed of a solid material, the forces imposed on the pipe 32 via the forming assemblies 14 and 18 would increase when contactingly engaging such deformities and, as a result, the forces imposed on the pipe 32 as the pipe 32 is passed through the forming assemblies 14 and 18 will increase sharply even to the point of locally deforming pipe 32. The elastomeric member 176 deforms in the presence of pipe deformities, such as the weld bead, for example, without substantially changing the overall force on pipe 32. In the contact area, it has been found that the forces imposed on the pipe 32 as the pipe 32 is passed through the forming assemblies 14 and 18 remains sufficiently uniform when the portions of the pipe 32 containing the deformities, such as the weld beads, for example, are passed through the forming assemblies 14 and 18. Thus, the construction of the rollers 124 of the present invention, having the elastomeric member 176 forming the engaging or contacting surfaces of the forming assemblies 14 and 18, substantially reduces or limits any undesired deformation of the pipe 32 resulting when such surfaces engage portions of the pipe 32 containing deformities (the weld beads, for example).

The rollers 124 each rotate about one of the shafts 156 or 158, and the shafts 156 and 158 are secured to the bar 150 such that the shaft 156 is spaced a distance 182 from the shaft 158, as shown in FIG. 6. The portions of the outer peripheral surfaces 178 formed via the recesses 180 are spaced apart a distance 184. The rollers 124 are sized such that the distance 184 is larger than the outer peripheral diameter of the pipe 32, which is useful in removing the pipe 32 from the forming assemblies 14 and 18 as will be described below in connection with FIGS. 17, 18, 19, and 20.

The elastomeric member 176 elastically deforms when in forming contact with pipe 32, thereby increasing the surface area of contact. The radius of recess 180 further increases the surface area contact. The member 176 and the recess 180 cooperate to reduce the unit surface bearing pressure on the surface of pipe 32, and to reduce substantially the chances of damaging pipe 32 by excessive surface bearing loads. Additionally, elastomeric member 176 locally deforms when contacted by deformities on pipe 32, such as a weld bead, for example, without substantially changing the unit bearing pressure on pipe 32.

The distance 182 is fixed via the position of the shafts 156 and 158 on the bar 150; however, the distance 184 can be changed selectively by replacing the rollers 124 with other rollers 124 having a different (larger or smaller) diameter. Thus, the forming assemblies 14 and 18 can be modified to accommodate and receive pipes 32 of different outer peripheral diameters by simply replacing the rollers 124 and the rollers 124 are mounted on cantilevered shafts 156 and 158 to permit the convenient removal and replacement thereof by simply removing the fasteners 174, thereby disconnecting the roller base 172 from the hub 168 or the entire rollers 124 can be removed from and installed on the shafts 156 and 158 via the removal or installation of retaining rings 186. Also, the distances 182 and 184 can be changed by removing the bar 150 and replacing the removed bar 150 with a bar 150 having the desired distances 182 and 184. The bar 150 can be removed by simply removing the rollers 124 and the plates 160 and then removing the bar 150 through an access opening 188 formed through the second face 142. The cantilevered shafts 156 and 158 and the construction of the rollers 124 also permits the convenient removal and replacement of the roller bases 172 by disconnecting and connecting the roller base 172 and the hub 168 via the fasteners 174 for repairing or replacing the elastomeric member 176.

A threaded drive shaft 190 is journally connected to the support frame 120 and a portion of the drive shaft 190 extends through a threaded opening 192 formed through a portion of the bar 150. A driver 194 is connected to the drive shaft 190 and the driver 194 is constructed to rotatingly drive the drive shaft 190 in a first direction of rotation and in an opposite second direction. As the drive shaft 190 is rotatingly driven in the first direction of rotation, the bar 150 is moved in a first direction 196 within the space 148 via the threaded engagement between the drive shaft 190 and the bar 150 and, as the drive shaft 190 is rotatingly driven in the second direction, the bar is moved in the second direction 198 via the threaded engagement between the drive shaft 190 and the bar 150. Thus, the position of the rollers 124 can be changed selectively via the drive shaft 190.

The driver 194 may be a hydraulic or electric motor or any other driver suitable for rotatingly driving the drive shaft 190 to move the bar 150 in the directions 196 or 198. In one embodiment, a control unit 200 is connected to the driver 194 via a control line 202 for actuating the driver 194 to rotate the driver shaft 190 to move the bar 150 in the first and the second directions 196 and 198 from a remote location, such as from a vessel on the surface 42 of the body of water, for example. The utilization of the threaded driver shaft 190 to position the bar 150 provides a "step less" type of positioner for allowing the positioning of the bar 150 and the roller 124 connected thereto in relatively small increments, which is beneficial in controlling the bend radius of the pipe 32 passing through the forming assemblies 14 and 18. In one preferred form, the control unit 200 includes a position indicating device having a portion connected to either the driver shaft 190 or the driver 194 for sensing and indicating the position of the bar 150. In this manner, the driver 194 can be controlled from a remote location via a control unit 200 with the position indicating device providing the necessary information to the operator for remotely positioning the bar 150 in predetermined locations.

It will be understood, of course, that other means may be utilized to position the rollers 124 in the desired location. Thus, for example, the drive shaft 190 can be rigidly attached to the bar 150 and the driver 194 can be adapted to rotate a suitable engaging device, such as a nut, for example, to position the bar 150 and the roller 124 in the desired location.

Assuming the pipe 32 is passing through the forming assembly 14 or 18 shown in FIG. 4 and it is desired to form the pipe 32 in a predetermined radius to provide the bent pipe 32 passing from second end 118 of the frame assembly 110 in the second direction 34, the control unit 200 is activated for causing the driver 194 on the support frame 120A to move the bar 150 supporting the rollers 124A and 124D to a position wherein the elastomeric member 176 of the roller 124A engages the pipe 32 imposing a force on the engaged portions of the pipe 32 in a general direction 204, the elastomeric member 176 of the roller 124D being spaced a distance from pipe 32 in this operative position of the rollers 124A and 124D. Further, the control unit 200 is activated for causing the driver 194 on the support frame 120B to move the bar 150 supporting the rollers 124B and 124E to a position wherein the elastomeric member 176 of the roller 124B engages the pipe 32 imposing a force on the engaged portions of the pipe 32 in a general direction 206, the elastomeric member 176 of the roller 124E being spaced a distance from pipe 32 in this operative position of the rollers 124B and 124E. The control unit 200 is activated for causing the driver 194 on the support frame 120C to move the bar 150 supporting the rollers 124C and 124F to a position wherein the elastomeric member 176 of the roller 124C engages the pipe 32 imposing a force on the engaged portions of the pipe 32 in a general direction 208, the elastomeric member 176 of the roller 124F being spaced a distance from the pipe 32 in this operative position of the rollers 124C and 124F. The exact position of the rollers 124A, 124B and 124C determines the radius on which the portions of the pipe 32 passing therebetween and the radius can be changed selectively by positioning the rollers 124A, 124B and 124C utilizing the drivers 194 which, in one embodiment, are controlled remotely via the control unit 200.

Assuming the pipe 32 is passing through the forming assembly 14 or 18 shown in FIG. 4 and it is desired to form the pipe 32 to provide an essentially straight pipe 32 passing from the first end 116 of the frame assembly 110 in the first direction 36 (the pipe 32 passing into the second end 118 being bent as shown in FIG. 4), the control unit 200 is activated for causing the driver 194 to move the bar 150 supporting the rollers 124A and 124D to a position wherein the elastomeric member 176 of the roller 124D engages the pipe 32 imposing a force on the engaged portions of the pipe 32 in the general direction 210, the elastomeric member 176 of the roller 124A being spaced a distance from the pipe 32 in this operative position of the rollers 124A and 124D. Further, the control unit 200 is activated for causing the driver 194 on the support frame 120B to move the bar 150 supporting the rollers 124B and 124E to a position wherein the elastomeric member 176 of the roller 124E engages the pipe 32 imposing a force on the engaged portions of the pipe 32 in the general direction 212, the elastomeric member 176 of the roller 124B being spaced a distance from the pipe 32 in this operative position of the rollers 124B and 124E. The control unit 200 is activated for causing the driver 194 on the support frame 120C to move the bar 150 supporting the rollers 124C and 124F to a position wherein the elastomeric member 176 of the roller 124F engages the pipe 32 imposing a force on the engaged portions of the pipe 32 in a general direction 214, the elastomeric member 176 of the roller 124C being spaced a distance from the pipe 32 in this operative position of the rollers 124C and 124F. The exact position of the rollers 124D, 124E and 124F determines the radius on which the portions of the pipe 32 passing therebetween and the radius can be changed selectively by positioning the rollers 124D, 124E and 124F utilizing the drivers 194 which, in one embodiment, are controlled remotely via the control unit 200.

The pipe passageways 16 and 20 through the forming assemblies 14 and 18, respectively, are each defined as the axial centerline of the portion of the pipe 32 passing through the forming assembly 14 and 18, generally between the opposite ends 116 and 118 of the frame assemblies 110. Since the pipe 32 is engaged via three rollers 124 which are offset with respect to each other, it will be apparent that the axially extending centerline of the portions of the pipe 32 passing through the forming assemblies 14 and 18 is curved in different directions at different positions within the forming assemblies 14 and 18. Thus, the pipe passageways 16 and 20, as shown in FIG. 1, more particularly, represents the average straight centerline of space between the rollers 124 which are positioned for contacting the portions of the pipe 32 passing through the forming assemblies 14 and 18.

Utilizing the riser 22, the portion of the pipe 32 extending between the first and the second ends 24 and 26 of the riser 22 can be placed in compression for driving the pipe 32 through the forming assemblies 14 and 18 since the riser 22 functions to reduce substantially the possibility of the pipe 32 buckling when exposed to such compression, thereby eliminating a requirement for rotating the rollers 124 via some driving means.

Since the rollers 124 are rotatingly supported, the friction resulting from engagement between the surfaces 126 of the rollers 124 and the pipe 32 substantially is reduced as compared to the friction utilizing stationary surfaces. The reduction in friction achieved utilizing the rotatingly supported rollers 124 reduces the need for rotatingly driving the rollers 124. However, in one form, the rollers 124 can be rotatingly driven (not shown) to drive the pipe 32 through the forming assemblies 14 and 18 and, in this embodiment, it is desirable to position all six of the rollers 124 in each of the forming assemblies 14 and 18 to engage the portions of the pipe 32 passing therethrough, the pairs of rollers (124A and 124D, 124B and 124E, and 124C and 124F) cooperating to drive the pipe 32 through the forming assemblies 14 and 18. In this last-mentioned alternative embodiment, it should be noted that it is not necessary to contact the pipe 32 with all six rollers 124 for the purpose of forming the pipe 32; however, the contacting of the pipe 32 with all six of the rollers 124 will add some support to minimize possible flattening or distortion of the pipe 32.

As the pipe 32 passes through the forming assemblies 14 and 18 in either the first or the second direction 34 or 36, the pipe 32 is contacted via three of the rollers 124 for the purpose of forming the pipe 32. In one alternate embodiment, the rollers 124 can be positioned on each forming assembly 14 and 18 such that the pipe 32 is contacted via all six of the rollers 124 as the pipe 32 passes through ether one of the forming assemblies 14 or 18. In this alternate embodiment, three of the rollers 124 contact the pipe 32 for the purpose of forming the pipe 32 and the other three rollers 124 cooperate to support the portions of the pipe 32 being formed and minimize possible flattening or distortion of the pipe 32.

In one other alternate embodiment (not shown), each of the rollers 124 on each support frame 120 can be mounted individually on a bar, similar to the bar 150, and each roller 124 can be moved individually in directions 196 and 198 via drive means, such as the drive shaft 190, the driver 194 and the control unit 200, for example. In this manner, each of the six rollers 124 is moved independently via one or more drive means for independently controlling the position of each of the six rollers 124, which may be desired in some applications.

It should be noted that the spacer frames 122A and 122B are removably connected to the support frames 120A, 120B and 120C. In this manner, the support frames 122A and 122B can be removed and replaced with spacer frames of a different size for varying the distance between support frames 120A, 120B and 120C. Thus, in accordance with the present invention, the distance between the spacer frames 120A and 120B and the distance between the spacer frames 120B and 120C can be varied by utilizing different size spacer frames 122A and 122B for maximizing the forming efficiency of the forming assemblies 14 and 18 with respect to forming pipes of different sizes, different wall thickness or different structural properties, for example, since less overall force is required to form a pipe or the like as the distances between the support frames 120A, 120B and 120C is increased within certain limits (the distance being limited via the spaces 60 and 66 in the embodiment of the invention shown in FIGS. 1, 2 and 3).

Experiments have shown that position adjustments of the rollers 124 on the first forming assembly 14 change the stress level in the pipe 32 which changes the reactive forces on the rollers 124 in the second forming assembly 18. In a like manner, position adjustments of the rollers 124 on the second forming assembly 18 results in a change of the reactive forces on the rollers 124 in the first forming assembly 14.

Although the forming assemblies 14 and 18 are referred to herein as a "first" forming assembly 14 and a "second" forming assembly 18, the forming assemblies 14 and 18 cooperate as a unit for forming the pipe 32 in predetermined radii through predetermined forming angles. In some applications, some of the rollers 124 shown in the drawings supported on the first forming assembly 14 can be located on the second forming assembly 18 and, in some other applications, some of the rollers 124 shown in the drawings supported on the second forming assembly 18 can be supported on the first forming assembly 14, for example. Further, all of the rollers 124 can be supported on a single frame in lieu of the two frame assemblies 110 shown in the drawings, if desired in some applications. In other words, it is the relative position of the operative rollers 124 which cause the pipe 32 to be formed in predetermined radii through predetermined forming angles and the two separate frame assemblies 110 merely illustrates one preferred structure for supporting the rollers 124.

EMBODIMENT OF FIGS. 7 AND 8

As mentioned before, the pipe installation system 10 of the present invention is utilized for interconnecting wellheads or other stations with manifolds or other stations. An example of one such possible interconnection is diagrammatically illustrated in FIGS. 7 and 8, wherein the pipe 32 has been formed via the forming assemblies 14 and 18, installed in the support structure 12 (FIG. 7), extended along a path near the floor surface 46, and installed in another support structure 12A. More particularly, the installation of control lines, such as electrical cables and hydraulic conduits, for example, between two underwater stations (support structures 12) in accordance with one aspect of the present invention is diagrammatically illustrated in FIG. 7, and the control lines are shown in one installed arrangement at the support structure 12A (FIG. 8).

A pipe, such as the pipe 32, for example, is installed between the support structure 12 and the remote support structure 12A by passing the pipe 32 through the riser 22 and through the forming assemblies 14 and 18 in a manner described before with respect to FIG. 1. The pipe 32 is passed from the support structure 12 through the conduit 88 and along a path generally parallel with the floor surface 46 toward the remote support structure 12. A wire line (not shown) is attached to pipe 32 and to a pulling mechanism (not shown) for pulling the pipe 32 from the support structure 12 to the remote support structure 12A, the wire line (not shown) pulling a portion of the pipe 32 through the conduit 88A. After the pipe 32 has been pulled through the conduit 88A, the portion of the pipe 32 extending through the conduit 88A can be cut or severed to some predetermined length, thereby leaving one end portion of the pipe 32 disposed at the remote support structure 12A, the remaining portion of the pipe 32 extending between the support structures 12 and 12A and through the support structure 12 terminating with the end of the pipe 32 which is connected to a power or control line feed assembly 230.

After the pipe 32 has been installed between the two support structures 12 and 12A, one end of the pipe 32 is connected to the power or control line feed assembly 230 which seals the end of the pipe 32 connected thereto, while allowing a control line 232 (shown in dashed-lines) to be passed in sealing engagement therethrough into and through the opening through the pipe 32, as diagrammatically shown in FIG. 7. A leading end 234 of the control line 232 is connected to a piston 236, which is sized to be inserted into and slidingly moved through the opening in the pipe 32 during the installation of the control line 232, the piston 236 including portions (not shown) sealingly engaging the pipe 32 for substantially preventing the flow of fluid through the opening in the pipe 32 about the piston 236 in one preferred form. An extension 238 is connected to the pipe 232 and the extension 238 is connected to a source 240 of pressurized fluid or air or the like (power fluid), the pressurized power fluid from the source 240 being in fluidic communication with the opening in the pipe 32 via the extension 238.

During the installation of the control line 232, the leading end 234 of the control line 232 is connected to the piston 236. The piston 236, with the control line 232 attached thereto, is passed through the control line feed assembly 230 and into the opening in the pipe 32. The piston 236 is passed through the opening in the pipe 32 to a position beyond the intersection of the extension 238 with the opening in the pipe 32. It should be noted that, depending upon the particular construction of the control line feed assembly, it may be necessary to pass the control line 232 through the control line feed assembly 230, and then, connect the leading end 234 of the control line 232 to the piston 236, the control line feed assembly 230 being connected to pipe 32 in sealing engagement after the piston 236 has been inserted into the opening in the pipe 32. Various devices and arrangements of such devices capable of functioning in the manner described before with respect to the control line feed assembly 230 are known in the art.

After the piston 236 has been positioned within the opening in the pipe 32 beyond the connection of the extension 238 to the pipe 32, power fluid is passed from the source 240 through the extension 238 and into the opening in the pipe 32. The power fluid fills the opening in the pipe 32, between the end thereof sealed via the control line feed assembly 230 and the piston 236, and the power fluid acts on the piston 236 driving the piston 236 through the opening in the pipe 32 in the general direction 242 (a direction generally parallel with the first direction 34) toward the second, remote installation (support structure 12A), the piston 236 pulling the control line 232 through the opening in the pipe 32 in the direction 242 via the connection between the piston 236 and the control line 232.

The piston 236 is driven via the power fluid through the opening in the pipe 32 to the remote support structure 12A (shown in FIG. 8) and the piston 236 is pulled or otherwise driven out from the opening in the pipe 32 at the remote support structure 12A, thereby disposing the leading end 234 of the control line 232 at the remote support structure 12A. A stop (not shown) can be disposed in the opening through the pipe 32 for stopping the movement of the piston 236 at a predetermined location near the end of the pipe 32 at the remote support structure 12A. After the movement of the piston 236 has been stopped, the piston 236 then can be removed from the pipe 32. Assuming the control line 232 is an electrical cable, for example, one end of the electrical cable is connected to an electrical control means 244 located at the remote support structure 12A and the opposite end (or ends in the case of a plurality of conductors) of the electrical cable is connected to an electrical power source or control apparatus (not shown) which may be located either in the support structure 12 (FIG. 7) or at a vessel or installation (not shown) located near the surface 42 of the body of water, thereby establishing electrical continuity between such electrical power source (not shown) and the electrical control box 244. In any event, the present invention provides a convenient system for passing control lines to remote locations.

In one other aspect, one or more removable stops (not shown) can be disposed in the opening of the pipe 32 at predetermined locations along the length of the pipe 32. The movement of the piston 236 through the pipe 32 is stopped via each of the one or more stops (not shown). This feature of the present invention is useful in installing various control lines, such as an electrical cable, for example, since the movement of the piston 236 is stopped at predetermined locations and, at each such location, the length of the control line which has been fed into the pipe 32 can be compared with the length of conduit to the location of a particular stop (not shown) for the purpose of determining if the control line has become tangled or bunched or otherwise misinstalled in some portion of the pipe 32, since the length of the control line should be the same as the known length of the pipe 32 to location of the stop (not shown) if the control line is properly installed within the pipe 32.

Additionally, control lines such as a hydraulic type control line 232 can be passed through the opening in the pipe 32 to the remote support structure 12A and connected to a reservoir for providing pressurized fluid for control purposes at the remote support structure 12A in a manner exactly like that described before with respect to electrical cable type of control line 232. The hydraulic and the electrical control line can be installed in the same pipe 32 or in different pipe (not shown) installed between the support structure 12 and the support structure 12A utilizing the pipe installation system 10 of the present invention. It will be understood, of course, that other members, such as a wire line, for example, can be installed within the pipe 32 in a like manner for utilization in installing a second pipe within the pipe 32, as will be described below in connection with FIG. 9. A second pipe can be installed in the pipe 32 utilizing a piston similar to the piston 236, in a manner to be described in greater detail below in connection with FIG. 23.

One other preferred embodiment for providing a source of pressurized fluid at a remote location (the remote support structure 12A) is diagrammatically illustrated in FIG. 8. In this embodiment, the electrical cable control line 232 is passed through a seal plug 246 and the seal plug is installed in the opening in the pipe 32 at the remote support structure 12A, the seal plug 246 sealingly engaging the pipe 32 and preventing the flow of fluid through the opening in the pipe 32 about the seal ring 246. An accumulator 248 is located at the remote support structure 12A and the accumulator 248 is connected to the opening in pipe 32 via a conduit 250. The accumulator 248 is in fluidic communication with the source 240 via the conduit 250, the opening in the pipe 32 and the extension 238 and the source 240 provides pressurized fluid to the accumulator 248 for use at the remote support structure 12A. It should be noted that the pressurized fluid provided via the pipe 32 can be connected directly to various apparatus located in the remote support structure 12A, thereby eliminating the need for the accumulator 248, if desired in some applications, or the pressurized fluid can be connected directly to some of the apparatus and accumulator 248 can be utilized to supply other apparatus. Thus, in the embodiment shown in FIG. 8, the one pipe 32 provides a path extending between the support structure 12 and the remote support structure 12A for accommodating the electrical cable and the pressurized fluid.

EMBODIMENT OF FIG. 9

The pipe installation system 10 of the present invention can be utilized for installing a second pipe 250 within the opening of the pipe 32. In this embodiment, the pipe 32 is installed in a like manner that described before, and the second pipe 250 is passed through the opening in pipe 32 and extended between the support structure 12 and another, remote support structure (such as the remote support structure 12A shown in FIG. 8) or some other remote installation, for example, the second pipe 250 being installed through the opening in the pipe 32 utilizing the pipe installation system 10 of the present invention in a manner like that described before with respect to the installation of the pipe 32.

As shown in FIG. 9, the diameter formed via the outer peripheral surface of the second pipe 250 is smaller than the diameter formed via the inner peripheral surface of the pipe 32 to permit the insertion of the second pipe 250 into and through the opening in the pipe 32.

The system illustrated in FIG. 9, can be utilized to replace worn or leaky pipe in certain situations, such as when well productivity is reduced to an extent that smaller flowline can accommodate the flow therethrough, for example. In addition, the system illustrated in FIG. 9, can be utilized to provide a steam jacketed type of flowline wherein steam is passed within the opening of the pipe 32 and some other fluid is passed within the opening of the second pipe 250, the steam being utilized to elevate the temperature level of the fluid flowing within the second pipe 250. In one other operational embodiment a corrosion inhibiting fluid can be passed through the opening in the pipe 32, while some other fluid is passed through the second pipe 250, the corrosion inhibiting fluid acting to protect the second pipe 250 which may be particularly useful when installing pipe in corrosive environments. Moreover, if an electrical cable is run through the pipe 32 or through the second pipe 259 or in lieu of the second pipe 250, an electrically non-conductive fluid may be passed through the pipe 32 in contact with such electrical cable for insulating such electrical cable and minimizing the possibilities of electrical failures (the non-conductive fluid also can be utilized as the power fluid provided to the remote support structure 12A, as described before with respect to FIGS. 7 and 8. In yet another operational embodiment, the pipe 32 can be utilized to convey fluid at one pressure level and the second pipe 250 can be utilized to convey fluid at some different pressure level.

EMBODIMENT OF FIG. 10

As mentioned before, a wire line can be attached to the leading end of the pipe 32 for pulling the pipe 32 from the support structure 12 to some remote support structure or some other remote installation. As shown in FIG. 10, a pipe plug 254 is connected to a leading end 256 of the pipe 32, such as by welding, for example, the pipe plug 254 sealingly closing the opening through the pipe 32 at the leading end 256 thereof.

One end of a wire line 258 is attached to the pipe plug 254 and the opposite end (not shown) of the wire line 258 is connected to a pulling mechanism, such as a winch, for example, for pulling the pipe 32 in a manner described before.

In one embodiment, as shown in FIG. 10, the wire line 258 comprises a relatively short first section 260 and a second section 262. One end of the first section 260 is connected to the pipe plug 254 and the opposite end of the first section 260 is swivelingly connected to a swivel 264. One end of the second section 262 is swivelingly connected to the swivel 264 and the opposite end of the second section 262 is connected to pulling mechanism (not shown). The swivel 264 provides a means for swivelingly connecting the wire line 258 to the leading end 256 of the pipe 32, which permits rotational movement (twist) of the pipe 32 relative to the wire line 258 and rotational movement (twist) of the wire line 258 relative to the pipe 32 during the installation of the pipe 32 without placing an undue stress on the connection between the wire line 258 and the pipe 32, thereby functioning to maintain the structural integrity of the connection between the pipe 32 and the wire line 258 during the installation of pipe in accordance with the present invention.

In one embodiment, the blowin preventers 80, 82, 86, 92, 94 and 96 may be eliminated. In this last-mentioned embodiment, the pipe 32 is passed through the riser 22 and through the forming assemblies 14 and 18 to a position wherein the leading end of the pipe 32 is disposed generally adjacent the flange 91 end of the conduit 88. In this position of the pipe 32, one end of the wire line 258 is passed through the conduit 88 and connected to the leading end 234 of the pipe 32. A seal device (not shown) is disposed in the conduit 88 for maintaining the sealing integrity of the space 66 as the wire line 258 is passed through the conduit 88 for connection to the pipe 32. After the wire line 258 is connected to the pipe 32, the workmen move to the dry environment provided within the compartment 46 of the chamber 50. In this manner, the pipe 32 can be pulled through the conduit 88 and the spaces 60 and 66 flooded with water since a relatively dry working environment is provided within the chamber 50.

It should be noted that the wire line 258 could be connected to the leading end of the pipe 32 by divers operating in the water environment outside the space 66 while maintaining a relatively dry environment within the space 66, in one operating mode. In the alternative, the space 66 can be flooded with water and the wire line 258 can be connected to the leading end of the pipe 32 by divers operating within the flooded environment within the space 66, thereby eliminating the necessity of maintaining a dry environment within the space 66. If the spaces 60 and 66 or portions thereof are flooded during the pipe forming operations, the spaces 60 and 66 could be sealed and the water then could be pumped from the spaces 60 and 66 to provide the relatively dry environments for making the pipe terminal connections.

EMBODIMENT OF FIG. 11

Shown in FIG. 11 is a modified support structure 12C, which includes a platform 52C connected to a wellhead 54C in a manner described before with respect to FIG. 1. A structure such as a rim 270 is connected to the platform 52C and at least two guide posts 272 are connected to the rim 270, each guide post 272 extending a distance from the rim 270 terminating with an end 274.

The support structure 12C also includes a framework 276, having a first end 278 and a second end 280. A first flange 282 is connected to the first end 278 and a second flange 284 is connected to the second end 280, the first flange 282 being connectable to the second end 26 of the riser 22 and the second flange 284 being connectable to the flange 91C. It will be understood by those skilled in the art that various other connectors can be utilized in lieu of the flanges 91C, 282 and 284, the flanges 282 and 284 being shown in the drawings merely for the purpose of illustrating one embodiment of an acceptable connector.

One end of a guide arm 286 is connected to the framework 276 and the guide arm 286 extends a distance from the framework 276, a guide 288 being connected to the guide arm 286, opposite the end connected to the framework 276. One end of a guide arm 290 is connected to the framework 276 and the guide arm 290 extends a distance from the framework 276, a guide 292 is connected to the guide arm 290, opposite the end connected to the framework 276. The guide 288 includes an opening (not shown) for receiving a portion of one of the guide posts 272, generally near the end 274, and the guide 292 includes an opening (not shown) for receiving a portion of the other guide post 272, generally near the pointed end 274.

The first forming assembly 14 is movably connected to the framework 276, generally near the first end 278, and the second forming assembly 18 is movably connected to the framework 276, generally near the second end 280. The first forming assembly 14 is positionable with respect to the second forming assembly 18 so that the forming assemblies 14 and 18 cooperate to form the portions of the pipe 32 passing therethrough through predetermined angles, and each of the forming assemblies 14 and 18 are positionable to form the portions of the pipe 32 passing therethrough in predetermined radii, in a manner and for reasons described before.

During the operation, the framework 276, with the forming assemblies 14 and 18 connected thereto, is lowered into the body of water to a position wherein one of the guide posts 272 is inserted through the opening (not shown) in the guide 288 and the other guide post 272 is inserted through the opening (not shown) in the guide 292. The guide posts 272 are oriented on the platform 52C and the guides 288 and 290 are oriented on the framework 276 to position the framework 276 on the platform 52C in a predetermined operative position wherein the second flange 284 is disposed near the flange 91C for connecting the framework 276 to the platform 52C and wherein the first flange 282 is disposed for connection to the second end 26 of the riser 22 to the first flange 282. After the framework 276 has been lowered into position, the second flange 284 is connected to the flange 91C and the riser 22 is lowered to a position wherein the second end 26 of the riser 22 is disposed generally adjacent the first connector 282. The second end 26 of the riser 22 then is connected to the first connector 282, thereby securing the riser 22 to the framework 276 in a predetermined operative position. In some applications, the riser 22 is connected to the first connector 282 on the surface vessel (not shown) and the framework 276, with the riser 22 connected thereto, is lowered into position on the platform 52C.

After the framework 276 has been connected to the platform 52C, the pipe 32 is passed through the riser 22 and the first and the second forming assemblies 14 and 18, in a manner and for reasons described before.

After the pipe 32 (or pipes as the case may be) has been formed via the forming assemblies 14 and 18, the pipe 32 is severed via cutting means (not shown) or via a cutting mechanism associated with the blind ram blowin preventer 92, the cutting of the pipe 32 preferably being effected from a vessel or other structure (not shown) located near the surface 42 of the body of water via remote controls (not shown) which are connected to the cutting device (not shown) or the cutting mechanism associated with the blowin preventer 92. After the pipe 32 (or pipes) has been severed, the portion of the pipe 32 in the framework 276 and in the riser 22, the framework 276 and the riser 22 are removed from the platform 52C, and then the chamber 50 is connected to the platform 52C for the purpose of providing a dry environment within which the various pipe terminal connections can be effected. Alternately, divers can be utilized to make such terminal connections.

Since the forming assemblies 14 and 18 are supported on the framework 276 within the body of water, the forming assemblies 14 and 18 can be constructed to accommodate larger sizes of pipe as compared to the forming assemblies 14 and 18 shown in FIG. 1 which are supported within the spaces 60 and 66, the size of the last-mentioned forming assemblies 14 and 18 being limited via the size of the spaces 60 and 66. With respect to the embodiment of the present invention shown in FIG. 11, the chamber 50 along with the auxiliary chamber 58 and the other auxiliary chambers can be connected to the platform 52C for the purpose of providing a dry environment within which the various pipe terminal connections can be effected.

A tension member 106C can be connected at the connection 109C to the guide post 272 which is connected to the guide arm 290 so the tension exerted by the tension member 106C at the connection 109C can be adjusted for the purpose of reducing the bending moments, in a manner and for reasons described before in connection with the tension member 106 shown in FIG. 1.

It should be noted that, in the embodiment of the invention shown in FIG. 11, the blowin preventers 78, 80, 82, 92, 94 and 96 are not included since the pipe installation system 10C is adapted for operating in a wet environment.

It should be noted that various structures, devices and assemblies can be utilized to position the framework 276 on the platform 52C and the rim 270, the guide posts 272, the guide arms 286 and 290 and the guides 288 and 292 have been described herein solely for the purpose of illustrating one specific means for guidingly positioning the framework 276 on the platform 52C.

EMBODIMENT OF FIGS. 12, 13 AND 14

As shown in FIGS. 12, 13 and 14, the forming assemblies 14 and 18 may include a pair of shaping roller assemblies 300, in one embodiment, one of the shaping roller assemblies 300 being disposed near the first end 116 and the other shaping roller assembly 300 being disposed near the second end 118 of the frame assembly 110. The shaping roller assemblies 300 each are constructed exactly alike and each includes a first pair of shaping rollers 302 and 304 and a second pair of shaping rollers 306 and 308. Each of the shaping rollers 302, 304, 306 and 308 is rotatingly supported via means not shown in the drawings.

The shaping roller 302 is disposed about one hundred and eighty degrees (180°) from the shaping roller 304 with respect to the pipe 32, and the shaping roller 306 is disposed about one hundred and eighty degrees (180°) from the shaping roller 308 with respect to the pipe 32. The first pair of shaping rollers 302 and 304 are spaced a distance axially with respect to the pipe 32 from the second pair of shaping rollers 306 and 308.

Each of the shaping rollers 302, 304, 306 and 308 is constructed exactly alike, and each shaping roller is generally circularly shaped, having an outer peripheral surface 310 and a recess 312 formed in the outer peripheral surface 310, as shown in FIG. 14. The outer peripheral surface 310 of the shaping roller 302 and 304 may abut one another or may be spaced apart, as shown in FIGS. 12, 13 and 14. The outer peripheral surface 310 of the shaping roller 306 is spaced a distance from the outer peripheral surface 310 of the shaping roller 308 for receiving the pipe 32 passing therebetween. Each recess 312 is formed on a radius such that the portion of each shaping roller formed via the recess 312 engages a portion of the outer peripheral surface of the pipe 32 and the shaping rollers are disposed about the pipe 32 such that the shaping rollers 302, 304, 306 and 308 cooperate to engage substantially the entire outer peripheral surface of the pipe 32 as pipe 32 passes between the shaping rollers.

The shaping rollers 302, 304, 306 and 308 each are constructed of a rigid material. The recesses 312 are shaped to engage the pipe 32 and cooperate to shape the portions of the pipe 32 passing between the shaping rollers in a shape having a generally circularly shaped cross-section. Thus, in the event the pipe 32 becomes deformed (non-circularly shaped cross-section) while passing through the forming assemblies 14 or 18 or in any other manner, the shaping roller assemblies 300 function to re-shape the pipe 32 into a form having a generally circularly shaped cross-section, before the pipe 32 is passed from the pipe installation system of the present invention.

EMBODIMENT OF FIG. 15

Figure 15:
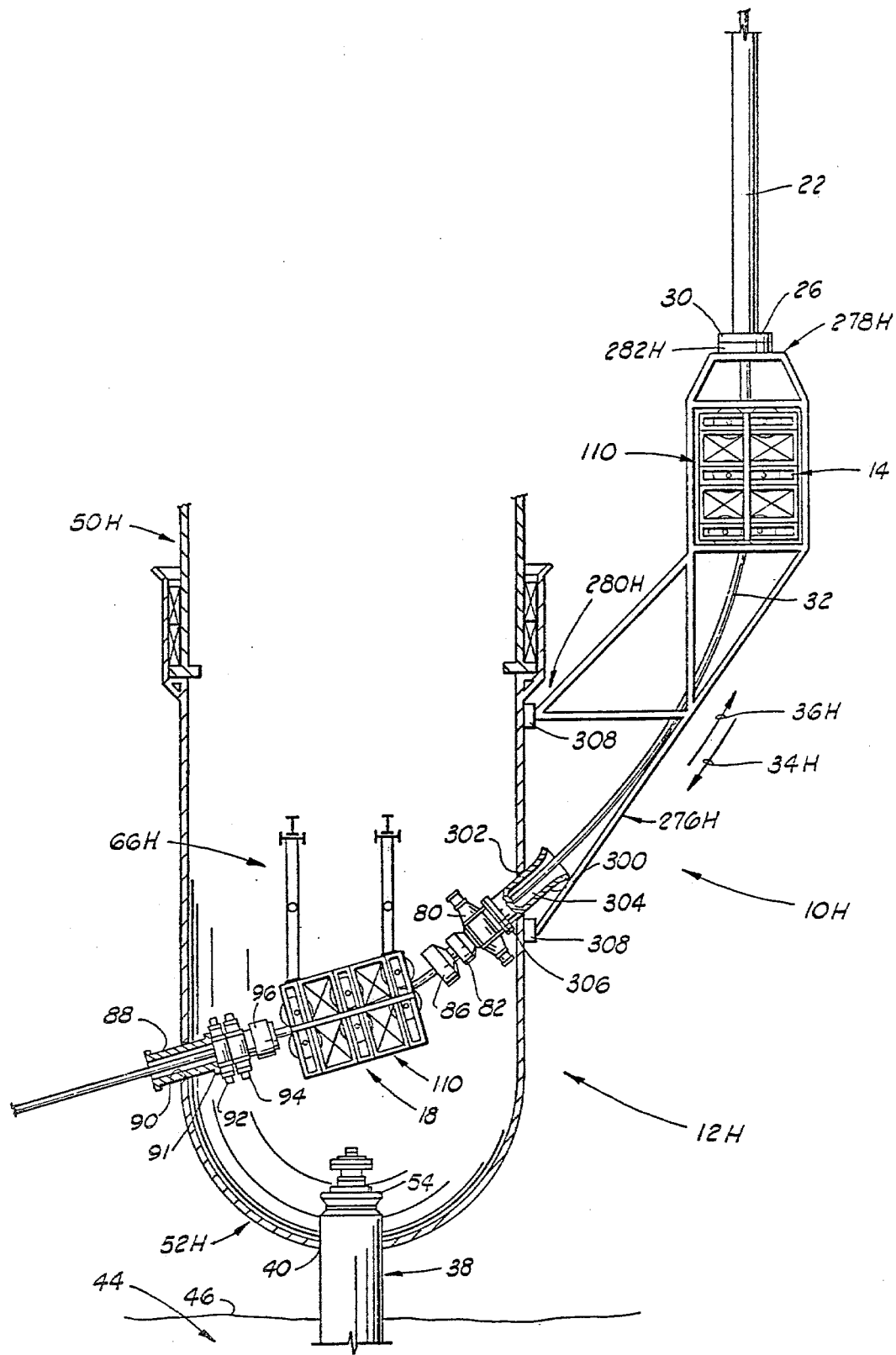
FIG. 15 is a diagrammatic, partial section, partial elevation view showing another embodiment of the pipe forming system of the present invention mounted in an operating position on one form of a support structure.

Shown in FIG. 15 is a modified pipe installation system 10H which is constructed similar to the pipe installation system 10 shown in FIG. 1, except the pipe installation system 10H includes a modified support structure 12H adapted to support the first forming assembly 14 within the body of water, the second forming assembly 18 being supported within the relatively dry environment defined via the space 66H in a manner like that described before with respect to the second forming assembly 18 shown in FIG. 1.

A conduit 300 extends through an opening 302 in the chamber 50H and the conduit 300 is sealingly secured to the chamber 50H in any convenient manner, such as by welding, for example. One end of the conduit 300 is disposed within the space 66H and an opening 304 extends through the conduit 300 providing communication between the space 66H and the water environment outside the space 66H. A flange 306 is formed on the end of the conduit 300 which is disposed within the space 66H.

The blind ram blowin preventer 80 is connected to the flange 306, the ram-type blowin preventer 82 is connected to the blowin preventer 80, and the annular blowin preventer 86 is connected to the blowin preventer 82. The blowin preventers 80, 82 and 86 cooperate to maintain the space 66H relatively dry while permitting a pipe to pass through the opening 304 in the first and the second directions 34H and 36H and otherwise operate in a manner and for reasons described before with respect to FIGS. 1, 2 and 3.

The support structure 12H includes a modified framework 276H, which is constructed similar to the framework 276 shown in FIG. 11, except brackets 308 are formed on the second end 280H for connecting the framework 276H to the chamber 50H. The first forming assembly 14 is movably connected to the framework 276H, generally near the first end 278H in a manner like that described before with respect to FIG. 11. In this embodiment, the second forming assembly 18 is supported within the space 66H, as mentioned before.

During the operation, the framework 276H, with the first forming assembly 14 connected thereto, is lowered into the body of water to a position wherein the brackets 308 are oriented in a predetermined disposition for connection to the chamber 50H, the brackets 308 being connected to the chamber 50H for connecting the framework 276H to the chamber 50H in a predetermined orientation with respect to the conduit 300. After the framework 276H has been connected to the chamber 50H, the riser 22 is lowered into a position wherein the second end 26 of the riser 22 is disposed generally adjacent the first flange 282H. The second end 26 of the riser 22 then is connected to the first flange 282H, thereby securing the riser 22 to the framework 276H in a predetermined operative position. In some applications, the riser 22 is connected to the framework 276H and the framework 276H, with the riser 22 connected thereto, is lowered into position near the chamber 50H.

After the framework 276H has been connected to the chamber 50H, the pipe 32 is passed in the first direction 34H through the riser 22, through the first forming assembly 14, through the opening 304 in the conduit 300, through the blowin preventers 80, 82 and 86, through the second forming assembly 18, through the blowin preventers 92, 94 and 96 and through the conduit 88. By the same token, the pipe 32 is passable in the second direction 36H through the forming assemblies 14 and 18, the pipe 32 being passable in the first and the second directions 34H and 36H through the forming assemblies 14 and 18 in a manner and for reasons described before.

By means (not shown) the framework 276H and other equipment such as the first forming assembly 14 can be encapsulated and sealingly connected to the conduit 300. In this last-mentioned embodiment, the blowin preventers 80, 82 and 86 may not be required. However, the blowin preventers 80, 82, and 86 are useful for control in the event of leaks even in this type of structure.

EMBODIMENT OF FIG. 16

Figure 16:
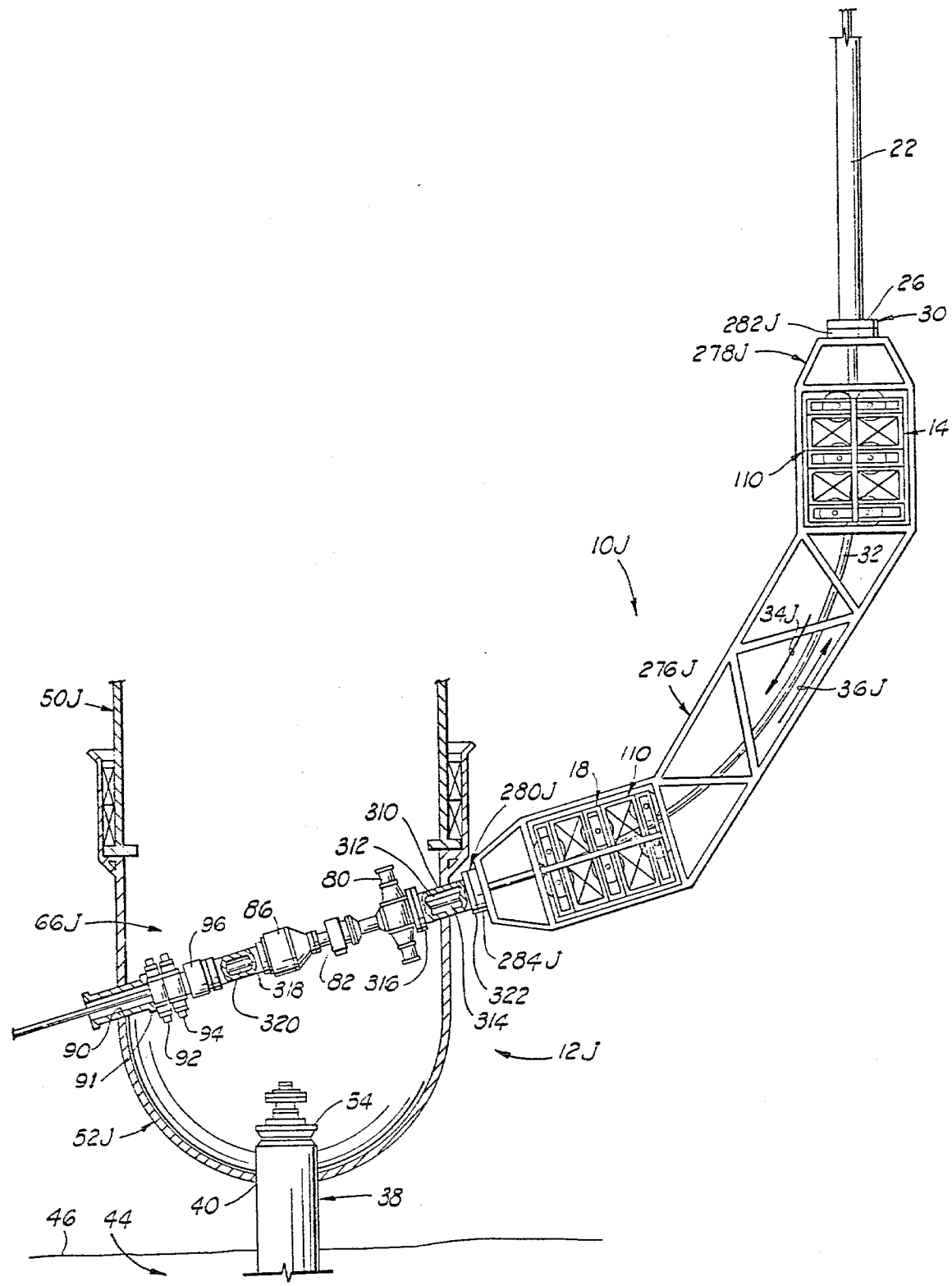
FIG. 16 is a diagrammatic, partial section, partial elevation view showing still another embodiment of the pipe forming system of the present invention mounting in an operating position on one form of a support structure.

Shown in FIG. 16 is a modified pipe installation system 10J which is constructed exactly like the pipe installation system shown in FIG. 1, except the pipe installation system 10J includes a modified support structure 12J adapted to support the first and the second forming assemblies 14 and 18 in the body of water, outside the relatively dry environment defined via the space 66J.

A conduit 310 extends through an opening 312 in the chamber 50J and the conduit 310 is sealingly secured to the chamber 50J in any convenient manner, such as by welding, for example. One end of the conduit 310 is disposed within the space 66J and an opening 314 extends through the conduit 310 providing communication between the water environment outside the space 66J, in a manner similar to that described before with respect to the conduit 300 shown in FIG. 15. A flange 316 is formed on the end of the conduit 310 which is disposed within the space 66J.

The blind ram blowin preventer 80 is connected to the flange 316, the ram-type blowin preventer 82 is connected to the blowin preventer 80, and the annular blowin preventer 86 is connected to the blowin preventer 82. The blowin preventers 80, 82 and 86 cooperate to maintain the space 66J relatively dry while permitting a pipe to pass through the opening 314 in the first and the second directions 34J and 36J and otherwise operate in a manner and for reasons described before with respect to FIGS. 1, 2 and 3.

One end of a conduit extension 318 is connected to the blowin preventer 96 and the opposite end of the conduit extension 318 is connected to the blowin preventer 86. The conduit extension 318 is disposed within the space 66J and an opening 320 extends through the conduit extension 318 providing a passageway which is sized to permit the passing of the pipe 32 therethrough in the first and the second directions 34J and 36J. The conduit extension 318 is removably and sealingly connected to the blowin preventers 86 and 96 to maintain the integrity of the relatively dry environment of the space 66J during the operation of the pipe installation system 10J. The conduit 318 permits the opening of the blowin preventers without flooding the space 66J during the installation of the pipe 32, thereby minimizing the wearing of the seal elements in the blowin preventers, as mentioned before.

The support structure 12J includes a framework 276J, which is constructed exactly like the framework 276 shown in FIG. 11, except the flange 284J is removably connectable to a flange 322 formed on the end of the conduit 310, opposite the end of the conduit 310 which is disposed within the space 66J. The first and the second forming assemblies 14 and 18 are each movably supported on the framework 276J in a manner like that described before with respect to FIG. 11.

During the operation, the framework 276J, with the first and the second forming assemblies 14 and 18 connected thereto, is lowered into the body of water to a position wherein the flange 284J is disposed near the flange 322, and the flange 284J is connected to the flange 322, thereby securing the framework 276J to the chamber 50J. After the framework 276J is connected to the chamber 50J, the riser 22 is connected to the framework 276J. The riser 22 can be connected to the framework 276J prior to lowering the framework 276J into the body of water, if desired in some applications.

After the framework 276J has been connected to the chamber 50J, the pipe 32 is passed in the first direction 34J through the riser 22, through the first and the second forming assemblies 14 and 18, through the conduit 310, through the blowin preventers 80, 82 and 86, through the conduit extension 318 through the blowin preventers 92, 94 and 96 and through the conduit 88. By the same token, the pipe 32 is passable in the second direction 36J, through the first and the second forming assemblies 14 and 18, the pipe being passable in the first and the second directions 34J and 36J through the forming assemblies 14 and 18 in a manner and for reasons discussed before.

EMBODIMENT OF FIGS. 17, 18, 19 AND 20

Shown in FIGS. 17, 18, 19 and 20 is a modified pipe installation assembly 10K which is constructed similar to the pipe installation system 10J shown in FIG. 16, except the forming assemblies 14 and 18 are supported on a modified support structure 12K. The modified support structure 12K includes a modified framework 226K and an offshore platform 400 or other offshore structure which is supported on the floor 44 of the body of water, a portion of the platform 400 being disposed in the body of water generally below the surface 42. The platform 400 is of the type commonly utilized with respect to various offshore operations relating to the drilling and production of oil and gas, for example, and generally comprises a plurality of support legs 402 which are anchored in the floor 44 and a plurality of brace members 404 which are securely interconnected to the support legs 402 (only two of the brace members 404 being designated via a reference numeral in FIG. 17 and only three support legs 402 being shown in FIG. 17 for clarity). A portion of a deck 406 is secured to a portion of each of the support legs 402, and the deck 406 is supported a distance above the surface 42 of the body of water via the support legs 402 and the interconnected brace members 404. The construction and utilization of various types of offshore platforms; such as the platform 400, are well known in the art and a detailed description is not required herein.

The framework 276K is removably connected to one of the support legs 402 via a connector assembly 407, and, in general, the connector assembly 407 is constructed such that the connector assembly 407 and the framework 276K are movably positionable on the support leg 402. More particularly, the connector assembly 407 is slidably connected to one of the support legs 402 such that the connector assembly 407 and the framework 276K connected thereto are slidable in a first direction 408 generally from the surface 42 toward the floor 44 of the body of water and in a second direction 410 generally from the floor 44 toward the surface 42 of the body of water.

It should be noted that, although the framework 276K is described herein as being connected to one of the support legs 402 of an offshore platform 400, the framework 276K and the connector assembly 407 could be connected to any support leg type of structure and the particular support leg structure associated with the platform 400 has been shown in FIGS. 17, 18, 19 and 20 merely for the purpose of illustrating one embodiment.

The connector assembly 407 (shown more clearly in FIG. 18) includes: a connector base 412, having a first end 414 and a second end 416; a first connector arm 418, having one end 420 which is connected to the connector base 412 generally near the first end 414 thereof, and an opposite end 422 which is journally or otherwise movably connected to the framework 276K generally near the first end 278K thereof; and a second connector arm 424 having one end 426 which is connected to the connector base 412 generally near the second end 416 thereof, and an opposite end 428 which is journally or otherwise movably connected to the framework 276K generally near the second end 280K thereof. Thus, the framework 276K with the forming assemblies 14 and 18 connected thereto is movable in a first direction 430 and in an opposite, second direction 432 relative to the connector base 412 about the journal connection between connector arms 418 and 424 and the framework 276K, for reasons to be described in greater detail below.

As shown more clearly in FIG. 19, the connector base 412 has an arcuately shaped surface 434 extending between the first and the second ends 414 and 416 and forming a first and a second side 436 and 438. The connector base 412 is sized and shaped such that the first side 436 engages one of the brace members 404 when the the connector base 412 rotates about the support leg 402 in a first direction 440, thereby limiting the movement of the connector base 412 about the support leg 402 in the first direction 440. Also, the connector base 412 is sized and shaped such that the second side 438 engages one of the brace members 404 when the connector base 412 rotates about the support leg 402 in a second direction 442, thereby limiting the movement of the connector base 412 about the support leg 402 in the second direction 442. Thus the engagement between the first and the second sides 436 and 438 and the brace members 404 positions the connector assembly 407 and the framework 276K connected thereto in a predetermined position relative to an axis substantially corresponding to the axially extending centerline axis of the support leg 402.

In one embodiment, as shown in FIG. 19, a plurality of bearing members 444 (only one of the bearing members 444 being designated via a reference numeral in FIG. 19 for clarity) are interposed between the arcuately shaped surface 434 of the connector base 412 and an outer surface 446 of the support leg 402. The bearing members 444 bearingly engage the connector base 412 and the support leg 402 to reduce the friction therebetween as the connector assembly 407 is moved in the first and the second directions 408 and 410 along the support leg 402.

Figures 17, 18:
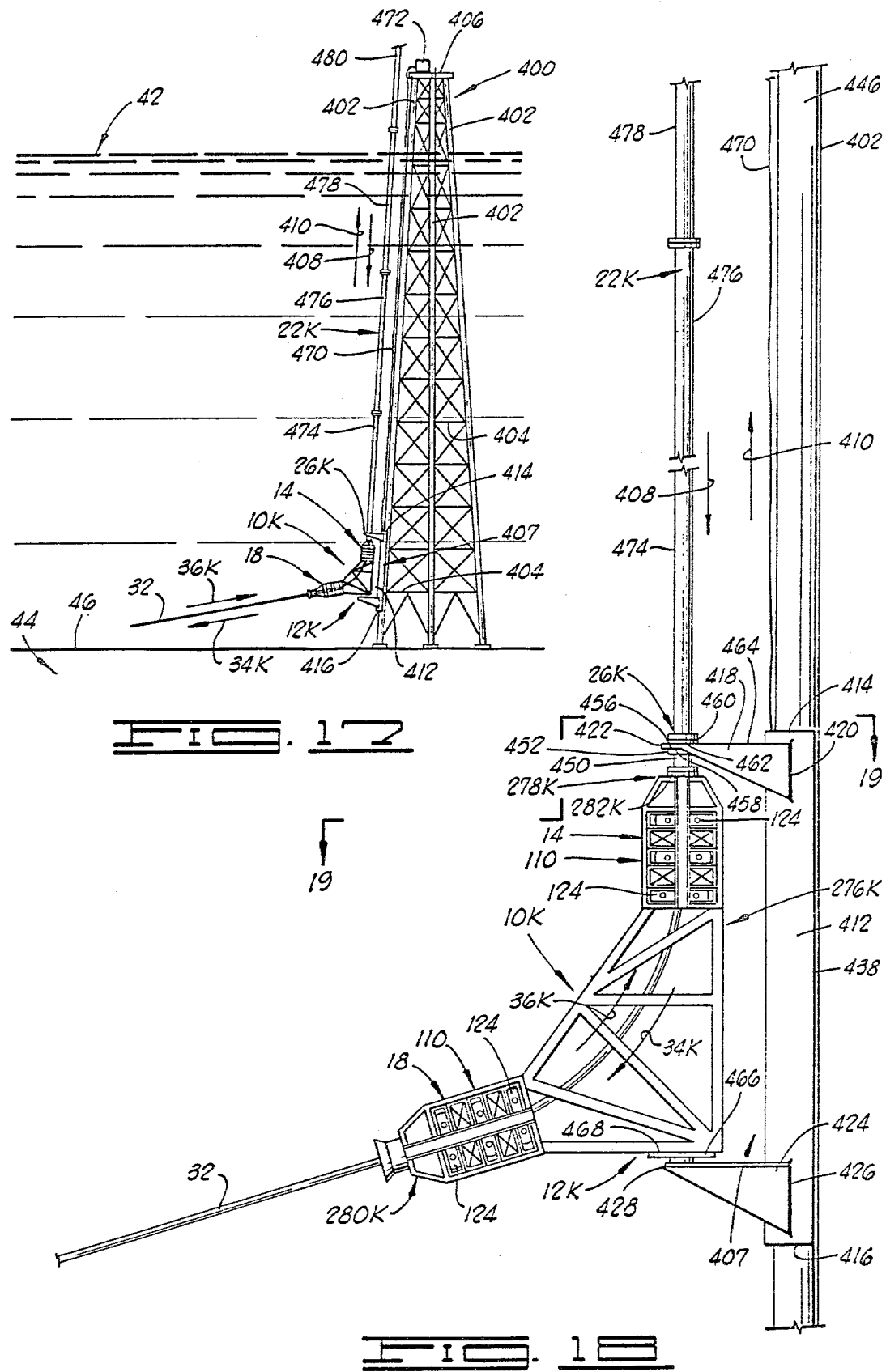
FIG. 17 is a diagrammatic view showing yet another embodiment of the pipe forming system of the present invention mounted on an offshore platform.
FIG. 18 is a side elevational view of the pipe forming system of FIG. 17.

An opening 448 is formed through the first connector arm 418, as shown more clearly in FIG. 19. As shown in FIGS. 18, 19 and 20, one end of a riser extension 450 is connected to the first flange 282K which is secured to the first end 278K of the framework 276K, and a portion of the riser extension 450 extends through the opening 448 in the first connector arm 418, the diameter formed via the outer peripheral surface of the riser extension 450 being less than the diameter of the opening 448. A first bearing plate 452 is connected to the riser extension 450 and the first bearing plate 452 extends a distance radially from the outer peripheral surface of the riser extension 450, thereby providing a bearing surface 456 which bearingly engages a portion of a first surface 458 of the first connector arm 418 generally near the opening 448. A second bearing plate 460 is connected to the riser extension 450 and the second bearing plate 460 extends a distance radially from the outer peripheral surface of the riser extension 450, thereby providing a bearing surface 462 which bearingly engages a portion of a second surface 464 of the first connector arm 418 generally near the opening 448.

The second bearing plate 460 is spaced a distance from the first bearing plate 452 along an axis substantially corresponding to the axial centerline axis of the riser extension 450, and a portion of the first connector arm 418 generally near the end 422 thereof is interposed between the first and the second bearing plates 452 and 460. The first bearing plate 452 engages a portion of the first connector arm 418, thereby limiting the movement of the riser extension 450 through the opening 448 in the second direction 410. The second bearing plate 460 engages a portion of the first connector arm 418, thereby limiting the movement of the riser extension 450 through the opening 448 in the first direction 408. Thus, the bearing plates 452 and 460 cooperate to secure the framework 276K to the first connector arm 418. It should be noted that bearing members, similar to the bearing member 444, can be interposed between the first connector arm 418 and the riser extension 450, generally about the opening 448, or bearing members can be interposed between the bearing surfaces 456 and 462 and the surfaces 458 and 464 of the first connector arm 418 to reduce the friction between the first connector arm 418 and the riser extension 450 when the framework 276K is rotated in the first and the second directions 430 and 432 during the operation of the pipe installation system 10K.

A third bearing plate 466, having a bearing surface 468, is connected to the second connector arm 424. As shown more clearly in FIGS. 18 and 20, the bearing surface 468 bearingly engages a portion of the framework 276K, thereby limiting the movement of the framework 276K in the second direction 410, the bearing plates 452, 460 and 466 cooperating with the connector arms 418 and 424 to support the framework 276K on the connector base 412 in a manner such that the framework 276K is rotatable in the first and the second directions 430 and 432.

During the operation, the connector assembly 407 is connected to the support leg 402 and the framework 276K, with the forming assemblies 14 and 18 connected thereto, is connected to the connector base 412 via the connector arms 418 and 424. The unit comprising the connector assembly 407, the framework 276K and the forming assemblies 14 and 18 is then lowered in the first direction 408 via a cable 470, having one end connected to the first end 414 of the connector base 412 and an opposite end connected to a winch 472 located on the deck 406 of the platform 400, as diagrammatically shown in FIG. 17. It should be noted that other arrangements and devices can be utilized to raise and lower the connector assembly 407 along the support leg 402 and the winch 472 and cable 470 have been shown and described herein merely for the purpose of illustrating one embodiment.

The connector assembly 407 is lowered in the first direction 408 until the connector assembly 407 is located on the support leg 402 at a desired position. As shown in FIGS. 17 and 18, the riser 22K, more particularly, comprises a plurality of riser sections 474, 476, 478 and 480 (four riser sections being shown in FIG. 17, for example). One end of the riser section 474 is connected to the second bearing plate 460 and the opposite end of the riser section 474 is connected to one end of the riser section 476, the opposite end of the riser section 476 being connected to one end of the riser section 478 and the opposite end of the riser section 478 being connected to one end of the riser section 480. It will be apparent from the foregoing that more or less riser sections can be connected to form the riser 22K in a manner like that just described.

During the operation, the riser section 474 can be connected to the second bearing plate 460 and the connector assembly 407 then can be lowered along the support leg 402 until the riser section 474 has lowered a sufficient distance to position the end thereof, opposite the end connected to the second bearing plate 460, in a predetermined position so the riser section 476 can be connected to the riser section 474. Then, the connector assembly 407 is further lowered in the first direction 408 and the remaining riser sections 478 and 480 are each connected to form the riser 22K in a manner like that just described with respect to the connection of the riser sections 474 and 476.

After the riser 22K has been connected to the framework 276K and the unit comprising the riser 22K, the connector assembly 407 and the forming assemblies 14 and 18 has been positioned on the support leg 402 in the desired positions, the rollers 124 (only some of the rollers 124 being designated via a reference numeral for clarity) of the forming assemblies 14 and 18 are positioned to engage the pipe 32 passing therethrough. Then, the pipe 32 is passed through the riser 22K and through the forming assemblies 14 and 18 for forming the pipe 32 in a predetermined radius through a predetermined angle in a manner described in detail before.

The pipe 32 can be passed through the forming assemblies 14 and 18 in the first and second directions 34K and 36K during the operation of the pipe installation system 10K, in a manner and for reasons described before. In any event, assuming the pipe 32 has been passed through the forming assemblies 14 and 18 in the first direction 36K and it is desired to disengage the pipe 32 from the forming assemblies 14 and 18, the rollers 124 of the forming assemblies 14 and 18 are each moved to a pipe disengaging position, as diagrammatically shown in FIG. 20. The distance 184 (FIG. 6) is greater than the diameter formed via the outer peripheral surface of the pipe 32 and, in the pipe disengaging position, the rollers 124 of the first and the second forming assemblies 14 and 18 are positioned such that the outer peripheral surface of the pipe 32 is spaced a distance from each of the rollers 124.

In the pipe disengaging position of the rollers 124, the framework 276K with the forming assemblies 14 and 18 connected thereto is rotated in the first direction 430 and, since there is a clearance between the pipe 32 and the rollers 124, the pipe 32 will remain in a relatively stationary position as the framework 276K and the forming assemblies 14 and 18 are moved in the first direction 430 to a position (indicated in dashed-lines in FIG. 19) wherein the pipe 32 is disengaged and removed from the forming assemblies 14 and 18. After the pipe 32 has been disengaged from the forming assemblies 14 and 18, the pipe 32 is severed generally near the riser extension 450 and the portion of the pipe 32 remaining in the riser 22K is withdrawn therefrom in the general direction 36K.

It should be noted that, in the embodiment of the invention shown in FIGS. 17, 18, 19 and 20, the forming assemblies 14 and 18 preferably include control units like the control unit 200, described before and shown in FIGS. 5 and 6, for positioning the rollers 124 in the pipe engaging position and the pipe disengaging position from some remote location, such as from the deck 406, for example.

The framework 276K can be rotated in the directions 430 and 432 via divers or, in one other form, the framework 276K can be rotated in the directions 430 and 432 from a remote location, such as from the deck 406, for example. In this last mentioned embodiment, a driven gear (not shown) can be secured to the outer peripheral surface of the riser extension 450, and a drive gear (not shown) which is connected to an electric or hydraulic motor (not shown) can be placed in gearing engagement with the driven gear (not shown) secured to the riser extension 450, the motor (not shown) being controlled from a remote location, such as the deck 406, for example. Thus, when the motor (not shown) is activated from the remote location, the drive gear (not shown) drivingly rotates the driven gear (not shown) and the riser extension 450 connected thereto, thereby rotating the framework 276K. In this embodiment, the motor (not shown) is reversible and thus the motor (not shown) can drivingly rotate the framework 276 in either the first direction 430 or the second direction 432 as controlled from the remote location.

In another embodiment, the third bearing plate 466 can be secured to the framework 276K (such as by welding, for example) and journally connected to the second connector arm 424. In this embodiment, a driven gear (not shown) is secured to the third bearing plate 466 and a drive gear (not shown) which is driven via a reversible, remotely controlled electric or hydraulic motor (not shown), the motor (not shown) drivingly rotating the third bearing plate 466 and the framework 276K in the directions 430 and 432 in a manner described before with respect to embodiment where the driven gear is connected to the riser extension 450.

In addition to the two embodiments described above, other apparatus for remotely rotating the framework 276K will be apparent to those skilled in the art in view of the foregoing, and the particular embodiments have been described above for the purpose of illustrating two operational embodiments.

EMBODIMENT OF FIGS. 21 AND 22

Shown in FIGS. 21 and 22 is another modified pipe installation system 10L which is constructed similar to the pipe installation system 10K shown in FIGS. 17, 18, 19 and 20, except the forming assemblies 14 and 18 are supported on a modified support structure 12L and the pipe installation system 10L includes a modified connector assembly 407K for slidably connecting the framework 276L to a support leg 402 in a manner similar to the connector assembly 407 shown in FIGS. 17, 18, 19 and 20 and described before.

The connector assembly 407L includes a connector base 412L which is constructed and connected to the support leg 402 in a manner exactly like that described before with respect to the connector base 412 shown in FIGS. 17, 18, 19 and 20. The end 420L of a modified first connector arm 418L is secured to the connector base 412L, generally near the first end 414L, and the end 426L of a modified second connector arm 424L is secured to the connector base 412L, generally near the second end 416L and spaced a distance from the first connector arm 418L. Each of the connector arms 418L and 424L extend a distance radially from connector base 412L. The end 422L of the first connector arm 418L, opposite the end 420L which is connected to the connector base 412L, is secured to the frame assembly 110 of the first forming assembly 14, and the end 428L of the second connector arm 424L, opposite the end 426L which is connected to the connector base 412L, is pivotally connected to the framework 276L.

The framework 276L comprises: a first hydraulic cylinder 500, having a cylinder base 502 and a cylinder rod 504; a second hydraulic cylinder 506, having a cylinder base 508 and a cylinder rod 510; and a third hydraulic cylinder 512, having a cylinder base 514 and a cylinder rod 516. The hydraulic cylinders 500, 506 and 512 comprise what is sometimes referred to herein as a framework control assembly 518, and the framework control assembly 518 cooperates to positionably support the forming assemblies 14 and 18 on the connector base 412L such that the forming assemblies 14 and 18 are movably positionable relative to each other so the forming assemblies 14 and 18 can be positioned in various positions for forming the pipe 32 passing therethrough through predetermined radii and so the forming assemblies 14 and 18 can be positioned in one position wherein the pipe passageways 16 and 20 are substantially aligned for removing the pipe 32 in a manner to be described in greater detail below.

The cylinder rod 504 is movably disposed in one end of the cylinder base 502 such that the cylinder rod 504 is movable in one direction 520 wherein the cylinder rod 504 is extended a distance from the cylinder base 502 in one actuated condition of the first hydraulic cylinder 500 and the cylinder rod 504 is movable in one other direction 522 wherein the cylinder rod 504 is retracted a distance into the cylinder base 502 in one other actuated condition of the first hydraulic cylinder 500. The end of the cylinder base 502, opposite the end having the cylinder rod 504 movably disposed therein, is pivotally connected to the frame assembly 110 of the first forming assembly 14, and the end of the cylinder rod 504, opposite the end of the cylinder rod 504 movably disposed in the cylinder base 502, is pivotally connected to the frame assembly 110 of the second forming assembly 18.

The cylinder rod 510 is movably disposed in one end of the cylinder base 508 such that the cylinder rod 510 is movable in one direction 524 wherein the cylinder rod 510 is extended a distance from the cylinder base 508 in one actuated condition of the second hydraulic cylinder 506 and the cylinder rod 510 is movable in one other direction 526 wherein the cylinder rod 510 is retracted a distance into the cylinder base 508 in one other actuated condition of the second hydraulic cylinder 506. The end of the cylinder base 508, opposite the end having the cylinder rod 510 movably disposed therein, is pivotally connected to the frame assembly 110 of the first forming assembly 14, and the end of the cylinder rod 510, opposite the end of the cylinder rod 510 movably disposed in the cylinder base 508, is pivotally connected to the frame assembly 110 of the second forming assembly 18.

The cylinder rod 516 is movably disposed in one end of the cylinder base 514 such that the cylinder rod 516 is movable in one direction 528 wherein the cylinder rod 516 is extended a distance from the cylinder base 514 in one actuated condition of the third hydraulic cylinder 512 and the cylinder rod 516 is movable in one other direction 530 wherein the cylinder rod 516 is retracted into the cylinder base 514 in one other actuated condition of the third hydraulic cylinder 512. The end of the cylinder base 514, opposite the end having the cylinder rod 516 movably disposed therein, is pivotally connected to the end 428L of the second connector arm 424L, opposite the end 426L which is connected to the connector base 412L, and the end of the cylinder rod 516, opposite the end of the cylinder rod 516 movably disposed in the cylinder base 514, is pivotally connected to the frame assembly 110 of the second forming assembly 18. More particularly, the cylinder rod 516 is pivotally connected to the support frame 120 of the second forming assembly 18 at the same pivot connection as the cylinder rod 516 of the second hydraulic cylinder 506.

In one embodiment, control lines (not shown) are connected to the hydraulic cylinders 500, 506 and 512 and the control lines (not shown) are connected to a control unit (not shown) which is located at some remote location, such as on the deck 406 of the offshore platform 400 (FIG. 17), for example. In this manner, the actuated condition of the hydraulic cylinders 500, 506 and 512 is controllable from the remote location for positioning the forming assemblies 14 and 18 in predetermined positions relative to each other to form the pipe 32 passing therethrough through predetermined radii and for positioning the forming assemblies 14 and 18 in a position such that the pipe passageways 14 and 18 are substantially aligned. Control lines and control units for remotely controlling the actuated condition of hydraulic cylinders are well known in the art and a further detailed description of the construction and the operation of such control lines and control units is not required herein.

It should be noted that, in the embodiment of the invention shown in FIGS. 21 and 22, the first forming assembly 14 is secured in a fixed position relative to the connector base 412 and the framework control assembly 518, more particularly, movably positions the second forming assembly 18 in predetermined positions relative to the first forming assembly 14.

During the operation, the framework 276L is connected to the connector assembly 407L, and the connector assembly 407L along with the framework 276L is lowered in the first direction 408 along the support leg 402 in a manner described before in connection with the embodiment shown in FIGS. 17, 18, 19 and 20, thereby lowering the forming assemblies 14 and 18 which are connected to the framework 276L. In one form, the framework control assembly 518 is conditioned such that the second forming assembly 18 is moved into a position wherein the pipe passageway 20 through the second forming assembly 18 is substantially aligned with the pipe passageway 16 through the first forming assembly 14 (shown in FIG. 22), thereby positioning the first and the second forming assemblies 14 and 18 generally near the connector base 412L as the connector assembly 407L is lowered along the support leg 402.

After the connector assembly 407L with the framework 276L connected thereto has been positioned on the support leg 402, the framework control assembly 518 is actuated or conditioned to move the second forming assembly 18 to some predetermined position relative to the first forming assembly 14, such as the position shown in FIG. 21, for example. More particularly, the framework control assembly 518 conditions the second hydraulic cylinder 506 such that the cylinder rod 510 is moved in the direction 526 generally away or out from the cylinder base 508, and the third hydraulic cylinder 512 is conditioned such that the cylinder rod 516 is moved in the direction 530 generally away or out from the cylinder base 514, the first hydraulic cylinder 500 being conditioned to retain the cylinder rod 504 in a position wherein the cylinder rod 504 remains retracted within the cylinder base 502. In this condition of the framework control assembly 518, the second forming assembly 18 is moved in a direction generally away from the connector base 412 and in a direction 410 to a position wherein the second forming assembly 18 is positioned relative to the first forming assembly 14 in some predetermined position, such as the position shown in FIG. 21, for example, for forming the pipe 32 passing through the forming assemblies 14 and 18 through a predetermined radius.

To position the second forming assembly 18 in the position shown in FIG. 21, the first hydraulic cylinder 500 is not actuated and the cylinder rod 504 remains retracted within the cylinder base 508 as the framework control assembly 518 positions the second forming assembly 18. Assuming the first hydraulic cylinder 500 is conditioned such that the cylinder rod 504 is moved in the direction 520 generally away or out from the cylinder base 502 and the second and the third hydraulic cylinders 506 and 512 are conditioned such that the cylinder rods 510 and 516 remain in a stationary position relative to the cylinder bases 508 and 514, the cylinder rod 504 of the first hydraulic cylinder 500 moves the second forming assembly 18 in a general direction 520 causing the second forming assembly 18 to be pivotally rotated about the pivot connection between the cylinder rods 510 and 516 and the second forming assembly 18, thereby causing the angular position of the second forming assembly 18 relative to the first forming assembly 14 to be changed. It will be apparent to those skilled in the art from the foregoing that the angular position of the second forming assembly 18 relative to the first forming assembly 14 can be selectively changed by changing the distance one or more of the cylinder rods 504, 510 and 516 is moved into or out from the respective cylinder bases 502, 508 and 514, thereby selectively changing the radius through which the pipe 32 is formed as the pipe 32 is passed through the forming assemblies 14 and 18.

When it is desired to pull the framework 276L in the second direction 410 along the support leg 402, the framework control assembly 518 is actuated such that the hydraulic cylinders 500, 506 and 512 are each conditioned to cause the cylinder rods 504, 510 and 516 to be retracted toward the respective cylinder bases 502, 508 and 514 until the second forming assembly 18 has been moved to a position wherein the pipe passageways 16 and 20 substantially are aligned, as shown in FIG. 22. As the second forming assembly 18 is moved to the position shown in FIG. 22 wherein the pipe passageways 16 and 20 substantially are aligned, the portion of the pipe 32 extending between the first and the second forming assemblies 14 and 18 is straightened to some extent.

After the pipe passageways 16 and 20 have been aligned, the rollers 124 of the first and the second forming assemblies 14 and 18 are positioned to engage and straighten the pipe 32 as the pipe 32 is passed therethrough in the second direction 36L. Thus, the first and the second forming assemblies 14 and 18 cooperate to straighten the pipe 32 as the pipe 32 is withdrawn or passed through the forming assemblies 14 and 18 so the pipe 32 can be passed in the general direction 36L through the relatively straight riser 22L. In this manner, the pipe 32 can be withdrawn in the second direction 36L through the forming assemblies 14 and 18 and through the riser 22L without first cutting the previously formed portions of the pipe 32 from the remaining relatively straight portions of the pipe 32, although it should be noted that it may be desirable to cut the pipe 32 generally near the second forming assembly 18, before removing the remaining portion of the pipe 32 in some applications.

In some applications it may be desirable to leave the straight portion of the pipe 32 and the formed portion of the pipe 32 as an integral unit after the forming operation. In this manner, the straight portion of the pipe 32 extends along the support leg 402 in the first direction 34L to a position generally near the deck 406 for connection to other apparatus and the straight portion of the pipe 32 extends along the support leg 402 in the second direction 36L to a position wherein the formed portion of the pipe 32 causes the pipe 32 to change direction and extend outwardly or generally perpendicularly from the support leg 402. In this application, the second forming assembly 18 is moved to the position wherein the pipe passageways 16 and 20 substantially are aligned in a manner described before, and then the connector assembly 407L with the framework 276L connected thereto is moved in the second direction 410 to a position wherein the forming assemblies 14 and 18 is removed from the pipe 32, the forming assemblies 14 and 18 essentially being pulled over the pipe 32 as the connector assembly 407L is moved in the second direction 410. Assuming the riser 22L is constructed of riser sections similar to the riser 22K described before in connection with the embodiment shown in FIGS. 17, 18, 19 and 20, each riser section can be removed after the connector assembly 407L has been moved in the second direction 410 a sufficient distance so the riser section is clear of the pipe 32 and positioned in a position where the riser section can be disconnected from the riser 22L. After all of the riser sections have been removed in a manner just described, the connector assembly 407L then is moved in the second direction 410 to a position wherein the pipe 32 has been cleared from the forming assemblies 14 and 18, thereby disconnecting the forming assemblies 14 and 18 from the pipe 32 while leaving the pipe 32 in a position wherein a portion of the pipe 32 extends generally along the support leg 402 and another portion of the pipe 32 extends in a direction generally angularly from the support leg 402 (the exact angle depending on the angle through which the pipe 32 is formed as the pipe 32 passes through the forming assemblies 14 and 18).

EMBODIMENT OF FIG. 23

Shown in FIG. 23 is a portion of modified pipe installation system 10M which is utilized to install a second pipe 540 through the pipe 32. In this embodiment, a piston 542 is connected to a leading end 544 of the second pipe 540, and one end of the pipe 32 is connected to a pipe feed assembly 546 which seals the end of the pipe 32 connected thereto, while allowing the second pipe 540 to be passed in sealing engagement therethrough into and through the opening in the pipe 32. The piston 542 is sized to be inserted into and slidingly moved through the opening in the pipe 32, the piston 542 including portions (not shown) sealingly engaging the pipe 32 for substantially preventing the flow of fluid through the opening in the pipe 32 about the piston 542 in a manner similar to that described before in connection with the embodiment shown in FIGS. 21 and 22. A source 548 of pressurized power fluid or air or the like (power fluid) is connected to the pipe 32 downstream from the second forming assembly 18 (not shown in FIG. 23), the pressurized power fluid being in fluidic communication with the opening in the pipe 32 via an extension 550.

During the installation of the second pipe 540, the leading end 544 is connected to the piston 542 and the piston 542, with the second pipe 540 connected thereto, is passed through the pipe feed assembly 546 and into the opening in the pipe 32. Power fluid then is passed from the source 548 into the opening in the pipe 32 and the power fluid fills the space between the outer peripheral surface of the second pipe 540 and the inner peripheral surface of the pipe 32, the power fluid acting on the piston 542 and driving the piston 542 through the opening in the pipe 32 in a general direction 552. As the piston 542 is driven in the direction 552 the second pipe 540 is pulled through the pipe 32 via the connection between the second pipe 540 and the piston 542, thereby installing the second pipe 250 in the opening of the pipe 32.

It should be noted that, although the various embodiments of the pipe installation system of the present invention have been described herein as including a first and a second forming assembly 14 and 18, the forming assemblies 14 and 18 cooperate to support the rollers 124 in predetermined positions for engaging the portions of the pipe 32 passing therethrough and forming the pipe 32 in predetermined radii and through predetermined forming angles. Thus, it is not necessary to support the rollers 124 on separate forming assemblies and the present invention contemplates pipe forming systems wherein the rollers 124 are supported on a single forming assembly or systems wherein the rollers 124 are supported on more than two forming assemblies. In addition to the foregoing, the present invention contemplates pipe installation systems where more or less than six rollers 124 are supported on a forming assembly. For example, either one or two rollers 124 could be supported on a support frame 120 and a number of support frames 120 could be supported on a framework such that the various support frames 120 support the rollers 124 in positions for engaging and forming the pipe 32 in predetermined radii and through predetermined forming angles.

The methods and apparatus of the present invention are useful for installing various members, such as wire lines, cables, control lines, conductors, conduits and the like, for example, and the "pipe 32" and the various references in this specification and in the claims to such pipe shall not be construed to limit the present invention as defined in the claims to installing any particular type of member.

Changes may be made in the construction and the operation of the various components and assemblies described herein and in the various steps and in the sequence of steps of the methods described herein without departing from the spirit and the scope of the invention as defined in the following claims.

What is claimed is:

1. An apparatus for forming a pipe, comprising:
a frame assembly means;
at least three surfaces supported on the frame assembly means and spaced apart a predetermined distance to form a pipe passageway, the three surfaces each being movable to an engaged position for engaging and forming the portions of the pipe passing through the pipe passageway in a predetermined radius and at least one of the surfaces each being movable to a disengaged position for disengaging the surfaces from the pipe to permit separation of the pipe from the surfaces and the frame assembly means;
means for movably positioning the surfaces on the frame assembly means to the engaged position and to the disengaged position; and
means for separating the surfaces and the frame assembly means from the pipe in the disengaged position of the surfaces.

2. The apparatus of claim 1 wherein each of the surfaces supported on the frame assembly means is defined further to include:
a roller, having an outer peripheral surface and being journally supported on the frame assembly means, the outer peripheral surface of the roller comprising one of the surfaces for engaging and forming the portions of the pipe.

3. The apparatus of claim 2 wherein each roller defined further to include:
a roller base having an outer peripheral surface;
an elastomeric member connected to and extending about the outer peripheral surface of the roller base, the elastomeric member having an outer peripheral surface forming one of the surfaces for engaging and forming the portions of the pipe, the elastromeric member being deformed when engaging portions of the pipe.

4. The apparatus of claim 3 wherein each elastomeric member is defined further to include a recess formed in the outer peripheral surface, the recess being formed on a radius for increasing the surface area of the elastomeric member engaging the portions of the pipe.

5. The apparatus of claim 2 wherein the frame assembly means is defined further to include:
means for journally supporting the rollers, comprising:
at least three shafts, each shaft, having opposite ends and being mounted on the frame assembly in a cantilevered manner, each of the rollers being journally supported on one of the shafts.

6. The apparatus of claim 2 wherein the means for movably positioning the surfaces is defined further to include:
at least three bars, each bar being movably supported on the frame assembly means;
at least three shafts, each shaft having opposite ends and one end of each shaft being connected to one of the bars, each shaft extending a distance from one of the bars and each roller being journally supported on one of the shafts; and
means for movably positioning each of the bars thereby movably positioning the rollers supported on the shafts for engaging and forming the portions of the pipe in predetermined radii.

7. The apparatus of claim 6 wherein each of the bars includes a threaded opening extending a distance through a portion thereof, and wherein the means movably positioning the bars is defined further to include:
at least three threaded drive shafts, each drive shaft having a portion extending through a portion of the threaded opening in one of the bars; and
at least three drivers, each driver being connected to one of the drive shafts for rotating the drive shaft connected thereto in one direction and in generally opposite direction, each bar and the roller supported thereon being moved in a first direction via the rotation of the drive shaft connected thereto in the one direction and each bar and the roller supported thereon being moved in a second direction via the rotation of the drive shaft connected thereto in the generally opposite direction.

8. The apparatus of claim 7 defined further to include:
a control unit connected to each of the drivers for remotely actuating the drivers to rotate the drive shafts in the first and the second directions, the control unit remotely positioning the rollers for engaging and forming the portions of the pipe in predetermined radii.

9. The apparatus of claim 8 wherein the control unit includes a position indicating device for sensing and indicating the positions of the bars, thereby indicating the positions of the rollers connected to the bars.

10. The apparatus of claim 1 defined further to include:
at least six surfaces supported on the frame assembly means, at least three of the surfaces being disposed for engaging and forming the portions of the pipe passing in the first direction through the pipe passageway in a predetermined radius and at least three surfaces being disposed for engaging and forming the portions of the pipe passing in the second direction through the pipe passageway in a predetermined radius.

11. The apparatus of claim 10 wherein the means for positioning the surfaces is defined further as being for movably positioning at least three of the surfaces on the frame assembly for engaging and forming the portions of the pipe passing in the first direction in predetermined radii, and for movably positioning at least three surfaces on the frame assembly for engaging and forming the portions of the pipe passing in the second direction in predetermined radii.

12. The apparatus of claim 1 defined further to include:

at least five surfaces supported on the frame assembly means, the surfaces being disposed for engaging and forming the portions of the pipe passing through the pipe passageway in a predetermined radius and through a predetermined forming angle.

13. The apparatus of claim 1 defined further to include:
at least ten surfaces supported on the frame assembly means, at least five of the surfaces being disposed for engaging and forming the portions of the pipe passing in the first direction through the pipe passageway in a predetermined radius and through a predetermined forming angle, and at least five of the surfaces being disposed for engaging and forming the portions of the pipe passing in the second direction through the pipe passageway in a predetermined radius and thorugh a predetermined forming angle.

14. The apparatus of claim 13 wherein the means for movably positioning the surfaces is defined further as being for movably positioning at least five of the surfaces on the frame assembly means for engaging and forming the portions of the pipe passing in the first direction in predetermined radii and through predetermined forming angles, and for movably positioning at least five of the surfaces on the frame assembly means for engaging and forming the portions of the pipe passing in the second direction in predetermined radii and through predetermined forming angles.

15. The apparatus of claim 1 defined further to include:
at least five surfaces movably supported on the frame assembly means, each of the surfaces being movable to one position for engaging and forming portions of the pipe passing through the pipe passageway in a predetermined radius through a predetermined forming angle, and each of the surfaces being movable to one other position wherein each of the surfaces is disengaged from the portion of the pipe disposed in the pipe passageway to permit the removal of the pipe from the means for forming the pipe.

16. The apparatus of claim 15 defined further to include:
at least ten surfaces movably supported on the frame assembly means, at least five of the surfaces being movable to one position for engaging and forming the portions of the pipe passing in a first direction through the pipe passageway in a predetermined radius and through a predetermined forming angle and being movable to one other position wherein the surfaces are disengaged from the portion of the pipe disposed in the pipe passageway, and at least five of the surfaces being movable to one position for engaging and forming the portions of the pipe passing in a second direction through the pipe passageway in a predetermined radius and through a predetermined forming angle and being movable to one other position wherein the surfaces are disengaged from the portion of the pipe disposed in the pipe passageway.

17. The apparatus of claim 16 wherein the surfaces are defined further as being disposed on the frame assembly means so that some of the surfaces are spaced a distance from the other surfaces greater than the diameter formed via the outer peripheral surface of the pipe so in the disengaged position of the surfaces each of the surfaces is disengaged from the pipe to permit the removal of the pipe from the pipe passageway.

18. The apparatus of claim 15 defined further to include:
a first forming assembly for supporting at least two of the surfaces;
a second forming assembly for supporting at least two of the surfaces; and
a framework, the first and the second forming assemblies being supported on the framework, the framework movably positioning the second forming assembly with respect to the first forming assembly for forming the pipe through predetermined forming angles.

19. The apparatus of claim 18 wherein the framework is defined further to include:
a first hydraulic cylinder having a portion pivotally connected to the first forming assembly and another portion pivotally connected to the second forming assembly; and
a second hydraulic cylinder having a portion pivotally connected to the first forming assembly and another portion pivotally connected to the second forming assembly, the first and the second hydraulic cylinders positionably supporting the first and the second forming assemblies, the pipe being formed through a selected forming angle at each position of the second forming assembly with respect to the first forming assembly.

20. The apparatus of claim 19 wherein the first and the second hydraulic cylinders are positionable for moving the second forming assembly into one position relative to the first forming assembly wherein the pipe passageway through the second forming assembly is substantially aligned with the pipe passageway through the second forming to facilitate the withdrawal of the pipe through the forming assemblies.

21. The apparatus of claim 19 for use in cooperation with a support leg, and wherein the apparatus is defined further to include:
a connector assembly, having a portion connectable to the support leg, the first forming assembly being connected to the connector assembly; and
wherein the framework is defined further to include:
a third hydraulic cylinder having a portion picotally connected to the connector base and another portion pivotally connected to the second forming assembly, the third hydraulic cylinder cooperating with the first and the second hydraulic cylinders for movably positioning the second forming assembly relative to the first forming assembly.

22. The apparatus of claim 1 for use in cooperation with a support leg and wherein the apparatus is defined further to include:
a framework for supporting the frame assembly; and
a connector assembly, having a portion connectable to the support leg and another portion movably connected to the framework, the framework being movable in a first direction with respect to the connector assembly to a position for positioning the surfaces to engage and form the pipe, and the framework being movable in a second direction with respect to the connector assembly for disengaging the surfaces from the pipe.

23. The apparatus of claim 22 wherein the connector assembly is defined further to include:
a connector base connectable to the support leg, and a second end;

a first connector arm having one end connected to the connector base generally near the first end of the connector base and an opposite end movably connected to the framework; and a second connector arm having one end connected to the connector base generally near the second end of the connector base and an opposite end movably connected to the framework, the framework being movable in the first and the second directions generally about the connections between the framework and the first and the second connector arms.

24. The apparatus of claim 23 wherein the connector base is defined further as being movably connected to the support leg for moving the connector base and the framework connected thereto in a first and a second direction generally along the support leg.

25. The apparatus of claim 23 defined further to include:

means disposed between the connector base and the support leg for movably connecting the base and the support leg for movably connecting the connector base to the support leg, the connector base and the framework connected thereto being movable in a first and a second direction generally along the support leg.

26. The apparatus of claim 22 for use in cooperation with an offshore structure, the support leg extending from the offshore structure beneath the surface of a body of water having a floor, and wherein the connector assembly is movably connected to the support leg for moving the connector assembly generally along the support leg between the surface and the floor of the body of water.

* * * * *